US012670384B2

(12) United States Patent　　　　　(10) Patent No.:　US 12,670,384 B2
Nishimura et al.　　　　　　　　　　　(45) **Date of Patent:　*Jun. 30, 2026**

(54) METHOD FOR DETERMINING CLASS OF DATA TO BE DETERMINED USING MACHINE LEARNING MODEL, INFORMATION PROCESSING DEVICE, AND COMPUTER PROGRAM

(71) Applicant: SEIKO EPSON CORPORATION, Tokyo (JP)

(72) Inventors: Shin Nishimura, Shiojiri (JP); Ryoki Watanabe, Matsumoto (JP); Hikaru Kurasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 907 days.

This patent is subject to a terminal disclaimer.

(21) Appl. No.: 17/590,930

(22) Filed: Feb. 2, 2022

(65) Prior Publication Data

US 2022/0245450 A1　　Aug. 4, 2022

(30) Foreign Application Priority Data

Feb. 3, 2021　　(JP) ................................. 2021-015502

(51) Int. Cl.
　　G06N 3/08　　　　(2023.01)
(52) U.S. Cl.
　　CPC ...................................... G06N 3/08 (2013.01)
(58) Field of Classification Search
　　CPC .......... G06N 3/08; G06N 3/045; G06N 20/00; G06F 18/22; G06F 18/2415
　　See application file for complete search history.

(56) References Cited

U.S. PATENT DOCUMENTS 5,210,798 A　　5/1993　Ekchian et al.
6,097,497 A　*　8/2000　McGraw ................ B41J 11/009
　　　　　　　　　　　　　　　　　　358/1.18

(Continued)

FOREIGN PATENT DOCUMENTS

CN　　　105787437 A　　7/2016
JP　　2019-212296 A　　12/2019

(Continued)

OTHER PUBLICATIONS

Ma et al., "Fine-Grained Vehicle Classification With Channel Max Pooling Modified CNNs," 2019, IEEE Transactions on Vehicular Technology, vol. 68, No. 4, Apr. 2019 (Year: 2019).*

(Continued)

*Primary Examiner* — Michael J Huntley
*Assistant Examiner* — Vincent Anton Spraul
(74) *Attorney, Agent, or Firm* — Oliff PLC

(57)　　　　　　ABSTRACT

A class determination method includes: step (a): preparing, for each of a plurality of classes, a known feature spectrum group obtained when a plurality of pieces of training data are input to a vector neural network type machine learning model; and step (b): executing, by using the machine learning model and the known feature spectrum group, a class determination processing on data to be determined. The step (b) includes step (b1), calculating a feature spectrum according to an input of the data to be determined to the machine learning model, step (b2), calculating a class similarity between the feature spectrum and the known feature spectrum group related to each of the plurality of classes, and step (b3), determining a class of the data to be determined according to the class similarity.

9 Claims, 13 Drawing Sheets

(56) References Cited

U.S. PATENT DOCUMENTS

| | | | | |
|---|---|---|---|---|
| 6,325,505 | B1 * | 12/2001 | Walker | B41J 19/205 |
| | | | | 347/19 |
| 10,140,515 | B1 * | 11/2018 | Waldo | G06F 16/639 |
| 11,189,367 | B2 | 11/2021 | Lisowska et al. | |
| 11,887,288 | B2 | 1/2024 | Yamazoe et al. | |
| 2002/0009213 | A1 * | 1/2002 | Rowe | G07C 9/37 |
| | | | | 382/128 |
| 2004/0008365 | A1 * | 1/2004 | Hobbs | G06F 3/1205 |
| | | | | 710/16 |
| 2015/0339558 | A1 * | 11/2015 | Kanai | B41J 11/009 |
| | | | | 358/1.6 |
| 2016/0196479 | A1 * | 7/2016 | Chertok | G06V 10/7557 |
| | | | | 382/156 |
| 2017/0356889 | A1 * | 12/2017 | Nakakimura | H01J 49/0036 |
| 2019/0371439 | A1 | 12/2019 | Lisowska et al. | |
| 2020/0269573 | A1 * | 8/2020 | Lin | G06N 20/00 |
| 2020/0285934 | A1 | 9/2020 | Hinton et al. | |
| 2021/0097400 | A1 * | 4/2021 | Lee | G06N 3/047 |
| 2021/0104313 | A1 | 4/2021 | Mizobe et al. | |
| 2021/0224957 | A1 | 7/2021 | Iwase et al. | |
| 2021/0390696 | A1 | 12/2021 | Iwase et al. | |
| 2021/0398259 | A1 | 12/2021 | Yamazoe et al. | |
| 2022/0067511 | A1 * | 3/2022 | Goldman-Shenhar | |
| | | | | G06V 30/274 |

FOREIGN PATENT DOCUMENTS

| | | |
|---|---|---|
| JP | 2020-166813 A | 10/2020 |
| WO | 2019/083553 A1 | 5/2019 |

OTHER PUBLICATIONS

Aguilera et al., "Learning cross-spectral similarity measures with deep convolutional neural networks," 2016, 2016 IEEE Conference on Computer Vision and Pattern Recognition Workshops (Year: 2016).*

Shimshoni et al., "Classification of Seismic Waveforms by Integrating Ensembles of Neural Networks," 1996, Proceedings of the 1996 IEEE Signal Processing Society Workshop (Year: 1996).*

Haase et al., "Classification of printing inks in pharmaceutucal [sic] packages by Laser-Induced-Breakdown Spectroscopy and Attenuated Total Reflectance-Fourier Transform Infrared Spectroscopy," 2020, Spectrochimica Acta Part B (Year: 2020).*

Hu et al., "Deep Convolutional Neural Networks for Hyperspectral Image Classification," 2015, http://dx.doi.org/10.1155/2015/258619 (Year: 2015).*

Muller et al., "A review of content-based image retrieval systems in medical applications-clinical benefits and future directions," 2004, International Journal of Medical Informatics (2004) 73, 1-23 (Year: 2004).*

Chen et al., "Similarity-based Classification: Concepts and Algorithms," 2009, Journal of Machine Learning Research 10 (2009) 747-776 (Year: 2009).*

Paoletti et al., "Capsule Networks for Hyperspectral Image Classification," 2019, IEEE Transactions on Geoscience and Remote Sensing, vol. 57, No. 4 (Year: 2019).*

U.S. Appl. No. 17/680,928, filed Feb. 25, 2022 in the name of Watanabe et al.

Li et al., "Fast exact classfication algorithm of massive fingerprint patterns based on capsule network," Journal of University of Chinese Academy of Sciences, vol. 37, No. 3, pp. 387-397, May 2020.

Jun. 16, 2025 Non-Final Rejection received in U.S. Appl. No. 17/680,928.

"Context Version 4: Neural Networks for Text Categorization", https://riejohnson.com/software/conText-v4-ug.pdf, Jul. 18, 2017) (Year: 2017).

Oct. 28, 2025 Office Action issued in U.S. Appl. No. 17/680,928.

Song et al., "Wavelength selection and spectral discrimination for paddy rice, with laboratory measurements of hyperspectral leaf reflectance", https://doi.org/10.1016/j.isprsjprs.2011.05.002, Sep. 2011.

* cited by examiner

*FIG. 3*

PREPARATION STEP

↓ S110

EXECUTE LEARNING OF MACHINE
LEARNING MODEL USING TRAINING DATA

↓ S120

GENERATE KNOWN FEATURE SPECTRUM GROUP
BY INPUTTING AGAIN TRAINING DATA TO LEARNED
MACHINE LEARNING MODEL

↓

END

FIG. 8

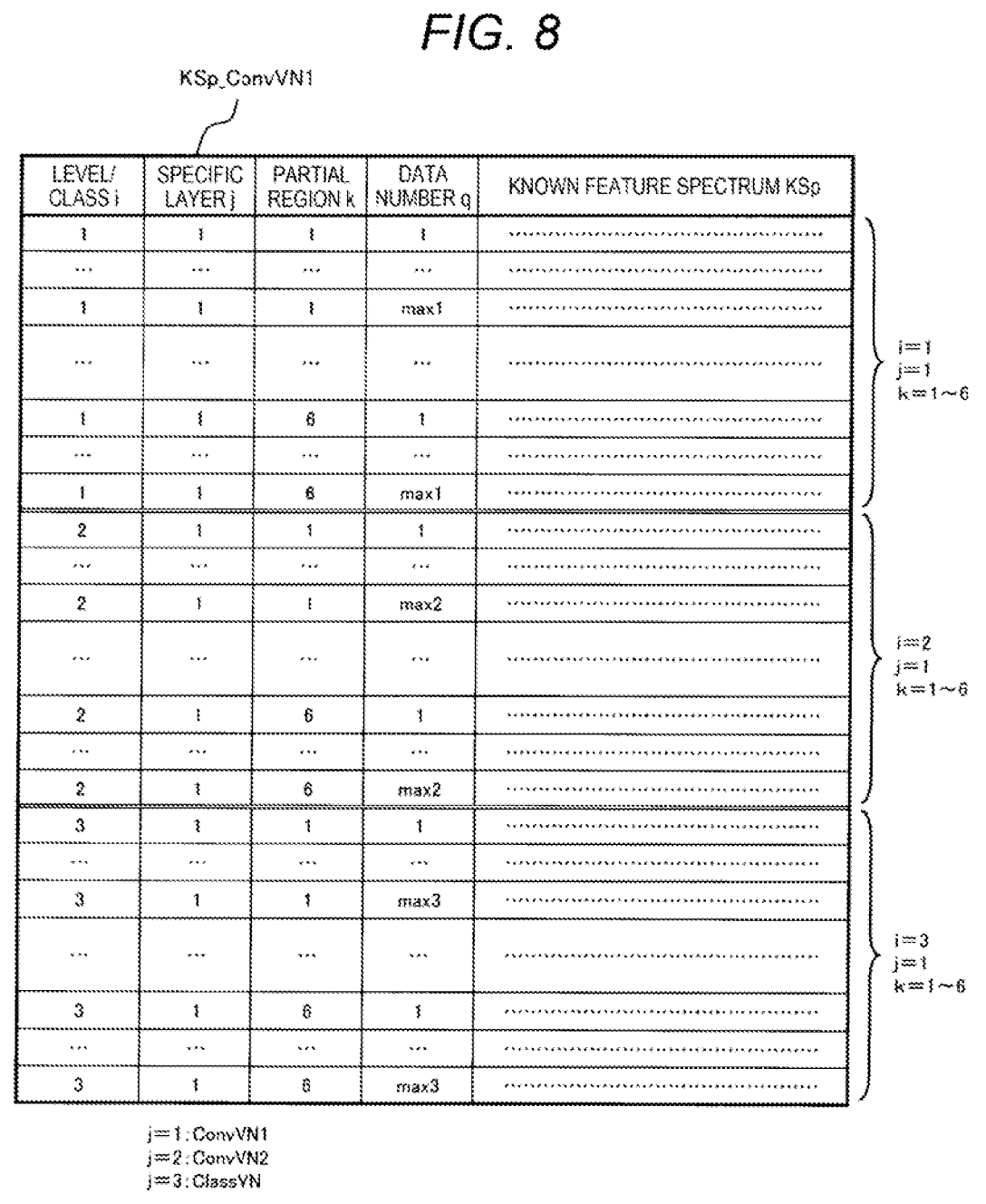

KSp_ConvVN1

| LEVEL/ CLASS i | SPECIFIC LAYER j | PARTIAL REGION k | DATA NUMBER q | KNOWN FEATURE SPECTRUM KSp | |
|---|---|---|---|---|---|
| 1 | 1 | 1 | 1 | .................................. | |
| ... | ... | ... | ... | .................................. | |
| 1 | 1 | 1 | max1 | .................................. | |
| ... | ... | ... | ... | .................................. | i=1 j=1 k=1~6 |
| 1 | 1 | 6 | 1 | .................................. | |
| ... | ... | ... | ... | .................................. | |
| 1 | 1 | 6 | max1 | .................................. | |
| 2 | 1 | 1 | 1 | .................................. | |
| ... | ... | ... | ... | .................................. | |
| 2 | 1 | 1 | max2 | .................................. | |
| ... | ... | ... | ... | .................................. | i=2 j=1 k=1~6 |
| 2 | 1 | 6 | 1 | .................................. | |
| ... | ... | ... | ... | .................................. | |
| 2 | 1 | 6 | max2 | .................................. | |
| 3 | 1 | 1 | 1 | .................................. | |
| ... | ... | ... | ... | .................................. | |
| 3 | 1 | 1 | max3 | .................................. | |
| ... | ... | ... | ... | .................................. | i=3 j=1 k=1~6 |
| 3 | 1 | 6 | 1 | .................................. | |
| ... | ... | ... | ... | .................................. | |
| 3 | 1 | 6 | max3 | .................................. | | j=1:ConvVN1
j=2:ConvVN2
j=3:ClassVN

FIG. 9

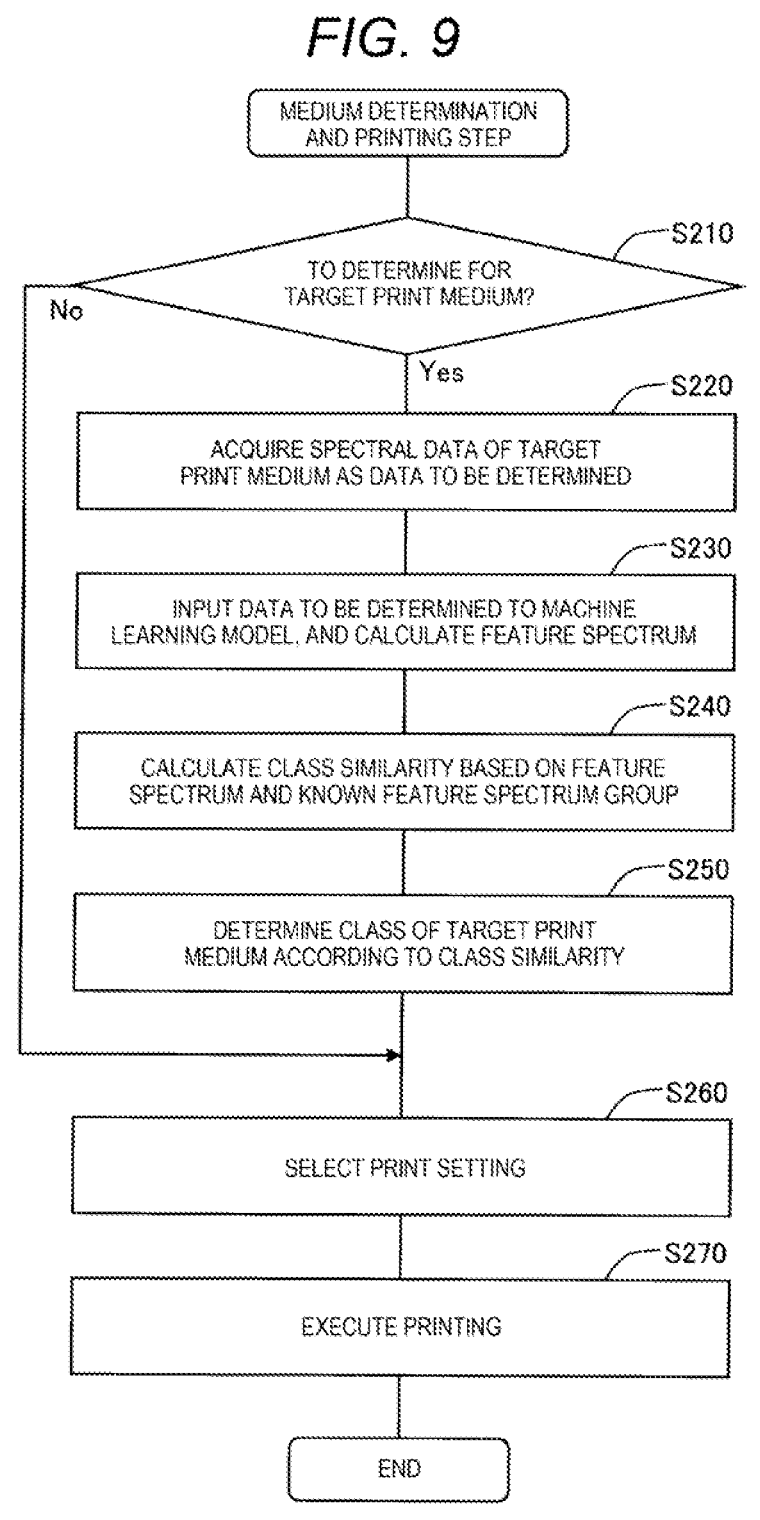

```
┌─────────────────────────┐
│  MEDIUM DETERMINATION   │
│    AND PRINTING STEP    │
└─────────────────────────┘
            │
            ▼
        ╱───────────╲                           ⌐ S210
      ╱   TO DETERMINE FOR   ╲
No ◄─┤  TARGET PRINT MEDIUM?  ├─
      ╲                   ╱
        ╲───────────╱
            │ Yes
            ▼                                    ⌐ S220
┌───────────────────────────────────────┐
│      ACQUIRE SPECTRAL DATA OF TARGET    │
│   PRINT MEDIUM AS DATA TO BE DETERMINED │
└───────────────────────────────────────┘
            │
            ▼                                    ⌐ S230
┌───────────────────────────────────────┐
│     INPUT DATA TO BE DETERMINED TO MACHINE  │
│ LEARNING MODEL, AND CALCULATE FEATURE SPECTRUM │
└───────────────────────────────────────┘
            │
            ▼                                    ⌐ S240
┌───────────────────────────────────────┐
│   CALCULATE CLASS SIMILARITY BASED ON FEATURE │
│  SPECTRUM AND KNOWN FEATURE SPECTRUM GROUP    │
└───────────────────────────────────────┘
            │
            ▼                                    ⌐ S250
┌───────────────────────────────────────┐
│      DETERMINE CLASS OF TARGET PRINT    │
│  MEDIUM ACCORDING TO CLASS SIMILARITY   │
└───────────────────────────────────────┘
            │
            ▼                                    ⌐ S260
┌───────────────────────────────────────┐
│           SELECT PRINT SETTING          │
└───────────────────────────────────────┘
            │
            ▼                                    ⌐ S270
┌───────────────────────────────────────┐
│             EXECUTE PRINTING            │
└───────────────────────────────────────┘
            │
            ▼
       ┌─────────┐
       │   END   │
       └─────────┘
```

FIG. 13

<THIRD CALCULATION METHOD M3>

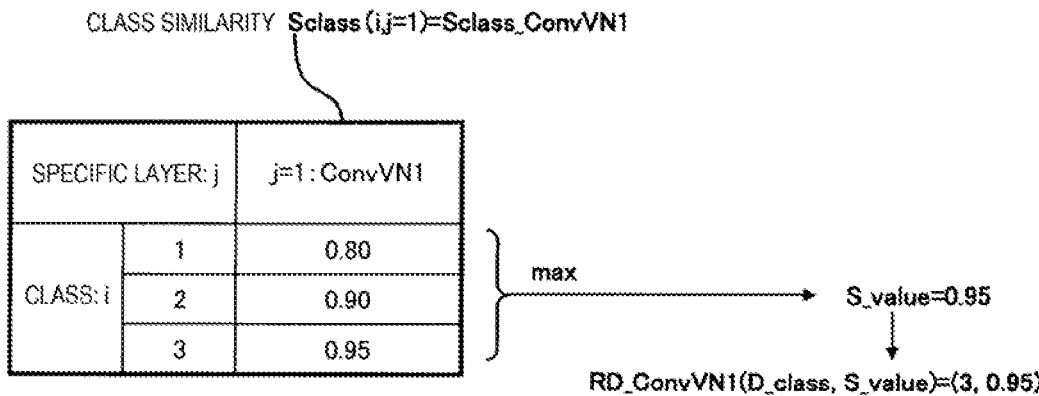

CLASS SIMILARITY $Sclass(i,j=1)=Sclass\_ConvVN1$

| SPECIFIC LAYER: j | | j=1 : ConvVN1 |
|---|---|---|
| CLASS: i | 1 | 0.80 |
| | 2 | 0.90 |
| | 3 | 0.95 | max → $S\_value=0.95$ $RD\_ConvVN1(D\_class, S\_value)=(3, 0.95)$ $Sclass(i,j)=max[G(Sp(j,k=all), KSp(i,j,k=all,q=all)])]$

FIG. 14

<FIRST DETERMINATION METHOD MM1 FOR CLASS
TO BE DETERMINED USING SPECIFIC LAYERS>

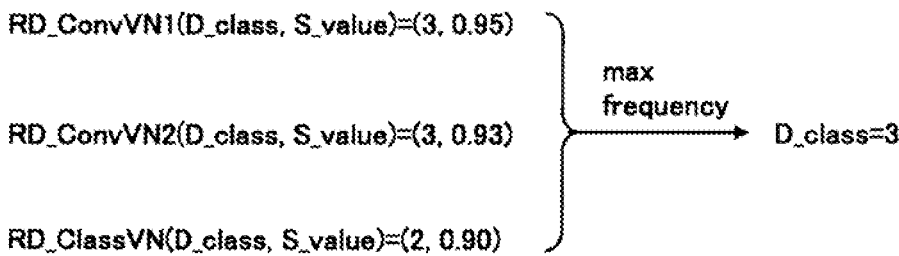

$RD\_ConvVN1(D\_class, S\_value)=(3, 0.95)$ $RD\_ConvVN2(D\_class, S\_value)=(3, 0.93)$ $RD\_ClassVN(D\_class, S\_value)=(2, 0.90)$ max frequency → $D\_class=3$

FIG. 15

<SECOND DETERMINATION METHOD MM2 FOR CLASS TO BE DETERMINED USING SPECIFIC LAYERS>

LOCAL SIMILARITY S(i, j=1, k)

| SPECIFIC LAYER: j | j=1: ConvVN1 | | | | | |
|---|---|---|---|---|---|---|
| PARTIAL REGION: k | 1 | 2 | 3 | 4 | 5 | 6 |
| CLASS PARAMETER i = 1 | 0.81 | 0.70 | 0.91 | 0.86 | 0.88 | 0.89 |
| CLASS PARAMETER i = 2 | 0.91 | 0.73 | 0.72 | 0.91 | 0.90 | 0.92 |
| CLASS PARAMETER i = 3 | 0.93 | 0.93 | 0.95 | 0.91 | 0.91 | 0.90 |

LOCAL SIMILARITY S(i, j=2, k)

| SPECIFIC LAYER: j | j=2: ConvVN2 | | |
|---|---|---|---|
| PARTIAL REGION: k | 1 | 2 | 3 |
| CLASS PARAMETER i = 1 | 0.75 | 0.88 | 0.88 |
| CLASS PARAMETER i = 2 | 0.80 | 0.83 | 0.91 |
| CLASS PARAMETER i = 3 | 0.93 | 0.93 | 0.90 |

ALLOCATE CLASS PARAMETER VALUE IN WHICH LOCAL SIMILARITY IS MAXIMUM

| SPECIFIC LAYER: j | j=1: ConvVN1 | | | | | |
|---|---|---|---|---|---|---|
| PARTIAL REGION: k | 1 | 2 | 3 | 4 | 5 | 6 |
| CLASS PARAMETER i | 3 | 3 | 3 | 3 | 3 | 2 |

VARIANCE =0.14

| SPECIFIC LAYER: j | j=2: ConvVN2 | | |
|---|---|---|---|
| PARTIAL REGION: k | 1 | 2 | 3 |
| CLASS PARAMETER i | 3 | 3 | 2 |

VARIANCE =0.22

ADOPT RESULT OF SPECIFIC LAYER ConvVN1 HAVING SMALLEST VARIANCE

D_class=3

METHOD FOR DETERMINING CLASS OF DATA TO BE DETERMINED USING MACHINE LEARNING MODEL, INFORMATION PROCESSING DEVICE, AND COMPUTER PROGRAM

The present application is based on, and claims priority from JP Application Serial Number 2021-015502, filed Feb. 3, 2021, the disclosure of which is hereby incorporated by reference herein in its entirety.

BACKGROUND

1. Technical Field

The present disclosure relates to a method for determining a class of data to be determined using a machine learning model, an information processing device, and a computer program.

2. Related Art

U.S. Pat. No. 5,210,798 and WO 2019/083553 disclose a capsule network as a vector neural network type machine learning model using vector neurons. The vector neuron means a neuron whose input and output is a vector. The capsule network is a machine learning model in which the vector neuron called a capsule is used as a node of a network. The vector neural network type machine learning model such as a capsule network can be used for class determination for input data.

The inventor of the present disclosure has found that, in the related art, a fine feature of the input data is omitted during transmission, is not correctly reflected in a class determination result in an output layer, and the class determination result may be incorrect. The present disclosure provides a technique for extracting a feature in an intermediate layer in which the fine feature of the input data is reflected, and performing the class determination on data to be determined.

SUMMARY

According to a first aspect of the present disclosure, there is provided a method for determining a class of data to be determined using a vector neural network type machine learning model having a plurality of vector neuron layers. The method includes: step (a), preparing, for each of a plurality of classes, a known feature spectrum group obtained from an output of a specific layer among the plurality of vector neuron layers when a plurality of pieces of training data are input to the machine learning model; and step (b), executing, by using the machine learning model and the known feature spectrum group, a class determination processing on the data to be determined. The step (b) includes step (b1), calculating a feature spectrum based on the output of the specific layer according to an input of the data to be determined to the machine learning model, step (b2), calculating a class similarity between the feature spectrum and the known feature spectrum group related to each of the plurality of classes, and step (b3), determining a class of the data to be determined according to the class similarity.

According to a second aspect of the present disclosure, there is provided an information processing device that executes a class determination processing of determining a class of data to be determined using a vector neural network type machine learning model having a plurality of vector neuron layers. The information processing device includes: a memory that stores the machine learning model; and a processor that executes a calculation using the machine learning model. The processor is configured to execute: a processing (a) of reading, from the memory for each of the plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing on the data to be determined. The processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity.

According to a third aspect of the present disclosure, there is provided a non-transitory computer-readable storage medium storing a computer program for causing a processor to execute a class determination processing of determining a class of data to be determined using a vector neural network type machine learning model having a plurality of vector neuron layers. The computer program causes the processor to execute a processing (a) of reading, from a memory for each of a plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing on the data to be determined. The processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity.

BRIEF DESCRIPTION OF THE DRAWINGS

FIG. 3 is a diagram illustrating a configuration of a machine learning model.

FIG. 8 is a diagram illustrating a configuration of the known feature spectrum group.

FIG. 9 is a flowchart showing a processing procedure of a medium determination and printing step.

FIG. 13 is a diagram illustrating a third calculation method for the class similarity.

FIG. 14 is a diagram illustrating a first determination method for a class to be determined using a plurality of specific layers.

FIG. 15 is a diagram illustrating a second determination method for the class to be determined using the plurality of specific layers.

DESCRIPTION OF EXEMPLARY EMBODIMENTS

A. System Configuration and Processing Procedure

Figure 1:
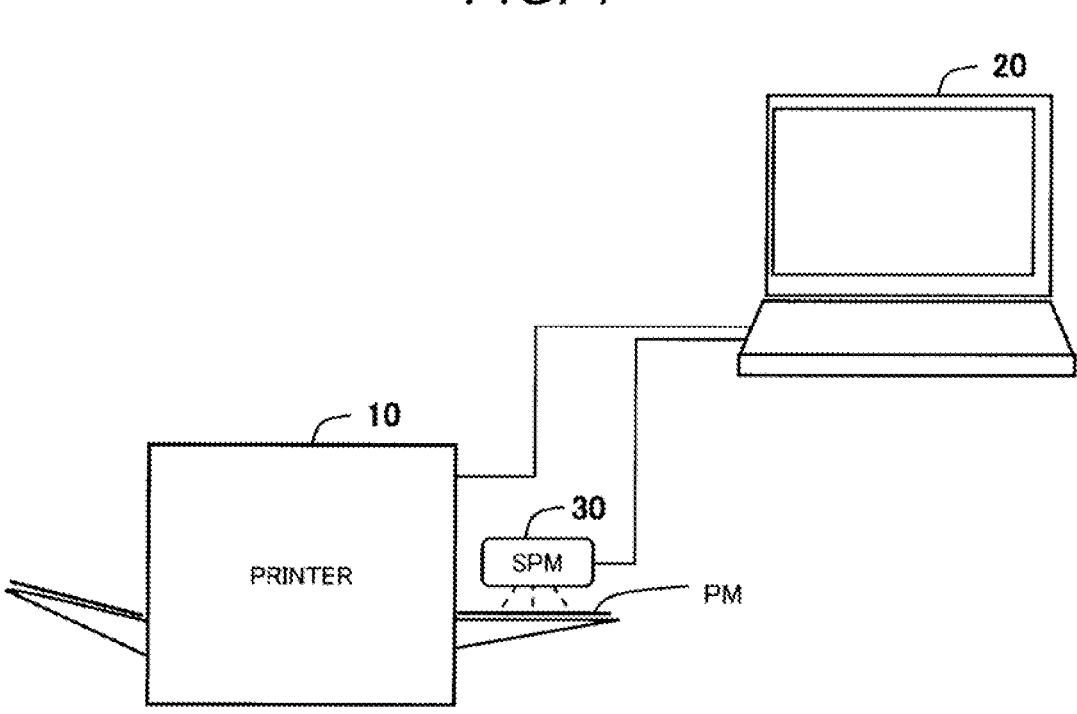
FIG. 1 is a block diagram of a class determination system according to an embodiment.

FIG. 1 is a block diagram showing a class determination system according to an embodiment. The class determination system is a printing system including a printer 10, an information processing device 20, and a spectrometer 30. The spectrometer 30 can acquire a spectral reflectance by performing spectroscopic measurement on a print medium PM to be used in the printer 10 in a non-printing state. In the present disclosure, the spectral reflectance is also referred to as "spectral data". The spectrometer 30 includes, for example, a wavelength variable interference spectroscopic filter and a monochrome image sensor. The spectral data obtained by the spectrometer 30 is used as data to be determined, which is input to a machine learning model to be described later. The information processing device 20 executes a class determination processing on the spectral data using the machine learning model, and determines whether the print medium PM corresponds to one of a plurality of classes. The expression "class of the print medium PM" means a type of the print medium PM. The information processing device 20 controls the printer 10 to print under an appropriate printing condition according to the type of the print medium PM. The class determination system according to the present disclosure may be implemented as a system other than the printing system, and may be implemented as a system that performs the class determination using, for example, an image to be determined, one-dimensional data other than the spectral data, a spectral image, or time-series data as the data to be determined.

Figure 2:
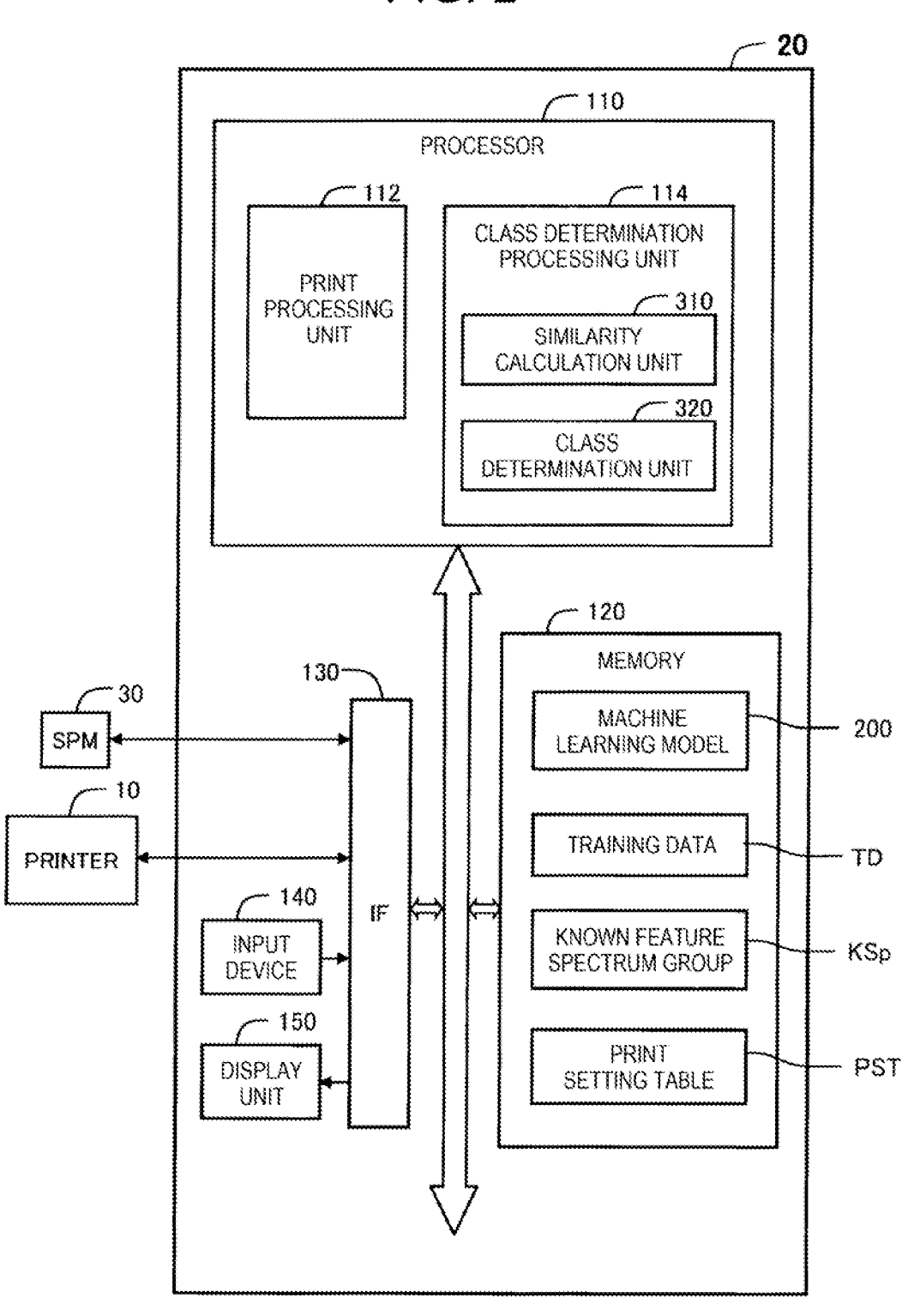
FIG. 2 is a block diagram of an information processing device.

FIG. 2 is a block diagram showing functions of the information processing device 20. The information processing device 20 includes a processor 110, a memory 120, an interface circuit 130, and an input device 140 and a display unit 150 coupled to the interface circuit 130. The spectrometer 30 and the printer 10 are also coupled to the interface circuit 130. Although not limited, for example, the processor 110 has not only a function of executing a processing described in detail below, but also a function of displaying data obtained by the processing and data generated in the process of the processing on the display unit 150.

The processor 110 functions as a print processing unit 112 that executes a print processing using the printer 10, and functions as a class determination processing unit 114 that executes the class determination processing on the spectral data of the print medium PM. The class determination processing unit 114 includes a similarity calculation unit 310 and a class determination unit 320. The print processing unit 112 and the class determination processing unit 114 are implemented by the processor 110 executing a computer program stored in the memory 120. However, these units 112 and 114 may be implemented by a hardware circuit. The processor in the present specification is a term including such a hardware circuit. The processor that executes the class determination processing may be a processor included in a remote computer connected to the information processing device 20 via a network.

The memory 120 stores a machine learning model 200, training data TD, a known feature spectrum group KSp, and a print setting table PST. The machine learning model 200 is used for a processing by the class determination processing unit 114. A configuration example and operation of the machine learning model 200 will be described later. The training data TD is a set of labeled data used for learning of the machine learning model 200. In the present embodiment, the training data TD is a set of spectral data. The known feature spectrum group KSp is a set of feature spectra obtained when the training data TD is input to the learned machine learning model 200. The feature spectrum will be described later. The print setting table PST is a table in which a print setting suitable for each print medium is registered.

Figure 3:
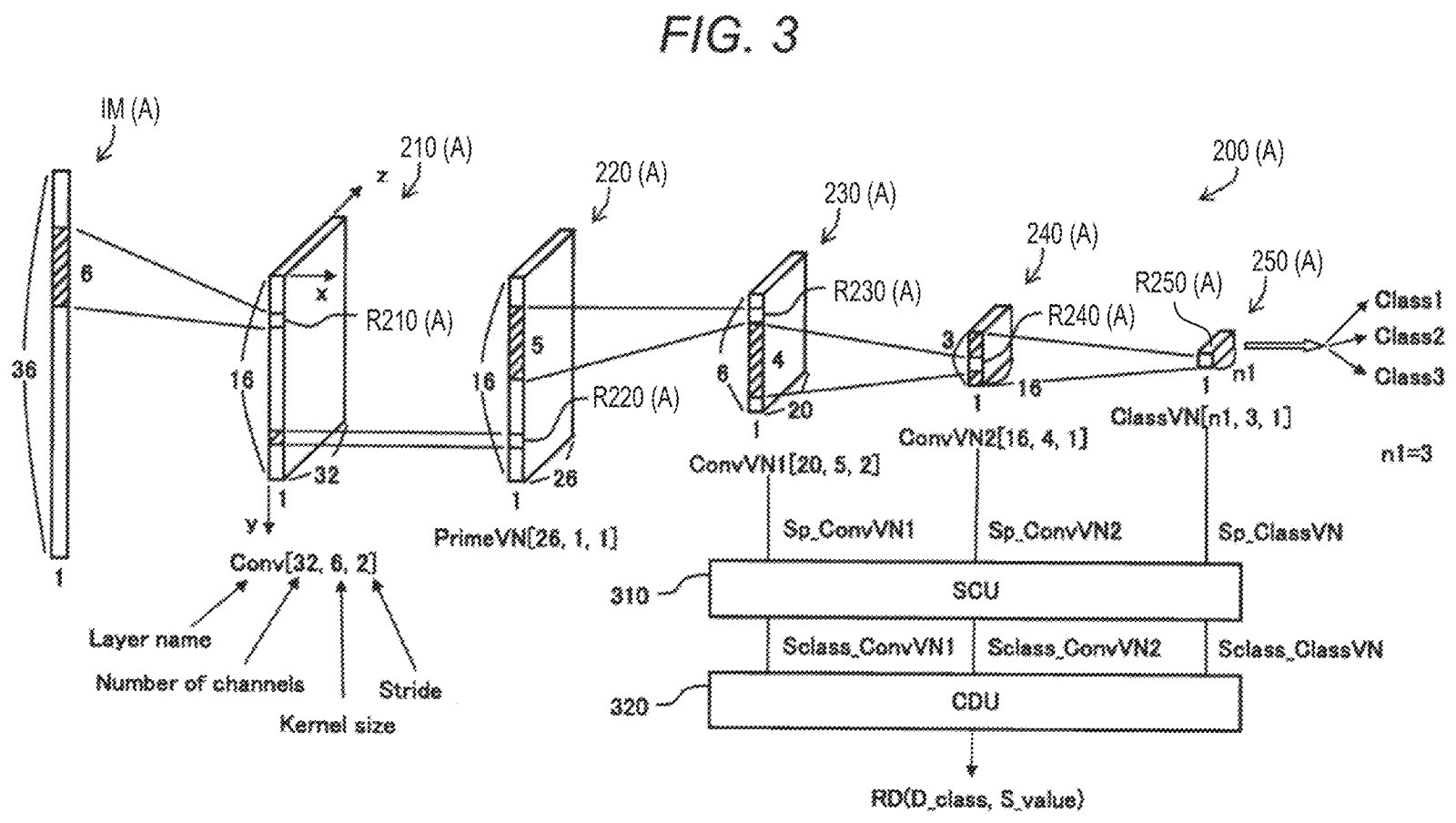

FIG. 3 is a diagram illustrating a configuration of the machine learning model 200(A). The machine learning model 200(A) includes, in an order from an input data IM(A) side, a convolutional layer 210(A), a primary vector neuron layer 220(A), a first convolutional vector neuron layer 230(A), a second convolutional vector neuron layer 240(A), and a classification vector neuron layer 250(A). Among these five layers 210(A) to 250(A), the convolutional layer 210(A) is the lowest layer, and the classification vector neuron layer 250(A) is the uppermost layer. In the following description, the layers 210(A) to 250(A) are also referred to as a "Conv layer 210(A)", a "PrimeVN layer 220(A)", a "ConvVN1 layer 230(A)", a "ConvVN2 layer 240(A)", and a "ClassVN layer 250(A)", respectively.

In the present embodiment, since the input data IM(A) is spectral data, the input data IM(A) is data of a one-dimensional array. For example, the input data IM(A) is data obtained by extracting 36 representative values every 10 nm from the spectral data in a range of 380 nm to 730 nm.

In an example of FIG. 3, two convolutional vector neuron layers 230(A) and 240(A) are used, but the number of convolutional vector neuron layers is optional, and the convolutional vector neuron layer may be omitted. However, it is preferable to use one or more convolutional vector neuron layers.

Configurations of the layers 210(A) to 250(A) in FIG. 3 can be described as follows.

Description of Configuration of Machine Learning Model 200

Conv layer 210(A): Conv [32, 6, 2]
PrimeVN layer 220(A): PrimeVN [26, 1, 1]
ConvVN1 layer 230(A): ConvVN1 [20, 5, 2]
ConvVN2 layer 240(A): ConvVN2 [16, 4, 1]
ClassVN layer 250(A): ClassVN [n1, 3, 1]
Vector dimension VD: VD=16

In the description of these layers 210(A) to 250(A), a character string before parentheses is a layer name, and numbers in the parentheses are the number of channels, a surface size of a kernel, and a stride in this order. For example, the layer name of the Conv layer 210(A) is "Conv", the number of channels is 32, the surface size of the kernel is 1×6, and the stride is 2. In FIG. 3, these descriptions are shown below each layer. A hatched rectangle drawn in each layer represents the surface size of the kernel used when an output vector of an adjacent upper layer is calculated. In the present embodiment, since the input data IM is the data of the one-dimensional array, the surface size of the kernel is also one dimension. Values of parameters used in the description of the layers 210(A) to 250(A) are merely examples, and can be optionally changed.

The Conv layer 210(A) is a layer composed of scalar neurons. The other four layers 220(A) to 250(A) are layers composed of vector neurons. The vector neuron is a neuron in which a vector is input and output. In the above description, a dimension of the output vector of each vector neuron is constant at 16. In the following description, a phrase "node" is used as an upper concept of the scalar neuron and the vector neuron.

In FIG. 3, a first axis x and a second axis y that define plane coordinates of a node array and a third axis z that represents a depth are shown for the Conv layer 210(A). In addition, it is shown that sizes of the Conv layer 210(A) in x, y, and z directions are 1, 16, and 32. The size in the x direction and the size in the y direction are called "resolution". In the present embodiment, the resolution in the x direction is always 1. The size in the z direction is the number of channels. These three axes x, y, and z are also used as coordinate axes indicating positions of the nodes in other layers. However, in FIG. 3, the axes x, y, and z are not illustrated in layers other than the Conv layer 210(A).

As well known, a resolution W1 in the y direction after convolution is given by the following equation.

$$W1 = \text{Ceil}\{(W0 - Wk + 1)/S\} \qquad (1)$$

Here, W0 is a resolution before convolution, Wk is the surface size of the kernel, S is the stride, and Ceil{X} is a function for performing an operation of rounding up X.

The resolution of each layer shown in FIG. 3 is an example when the resolution of the input data IM(A) in the y direction is 36, and an actual resolution of each layer is appropriately changed according to the size of the input data IM(A).

The ClassVN layer 250(A) has n1 channels. In the example of FIG. 3, n1=3. In general, n1 is an integer of 2 or more, and is the number of known classes that can be determined using the machine learning model 200(A). Determination values Class 1 to Class 3 for the three known classes are output from the three channels of the ClassVN layer 250(A). Usually, a class having the largest value among the determination values Class 1 to Class 3 is used as the class determination result for the input data IM(A). When the largest value among the determination values Class 1 to Class 3 is less than a predetermined threshold value, it may be determined that the class of the input data IM(A) is unknown.

In the present disclosure, as described later, instead of using the determination values Class 1 to Class 3 of the ClassVN layer 250(A) as the output layer, the class to be determined is determined using a class similarity calculated based on an output of a specific vector neuron layer.

In FIG. 3, a partial region Rn in each of the layers 210(A), 220(A), 230(A), 240(A), and 250(A) is further illustrated. A suffix "n" of the partial region Rn is a sign of each layer. For example, the partial region R210(A) indicates the partial region in the Conv layer 210(A). The "partial region Rn" is a region that is specified by a plane position (x, y) defined by a position of the first axis x and a position of the second axis y in each layer and includes a plurality of channels along the third axis z. The partial region Rn has dimensions of "Width"×"Height"×"Depth" corresponding to the first axis x, the second axis y, and the third axis z. In the present embodiment, the number of nodes included in one "partial region Rn" is "1×1×depth", that is, "1×1×number of channels".

As illustrated in FIG. 3, a feature spectrum Sp_ConvVN1 to be described later is calculated based on the output of the ConvVN1 layer 230(A), and is input to the similarity calculation unit 310. Similarly, feature spectra Sp_ConvVN2 and Sp_ClassVN are calculated based on outputs of the ConvVN2 layer 240(A) and the ClassVN layer 250(A), respectively, and input to the similarity calculation unit 310. The similarity calculation unit 310 calculates class similarities Sclass_ConvVN1, Sclass_ConvVN2, and Sclass_ClassVN, which will be described later, by using the feature spectra Sp_ConvVN1, Sp_ConvVN, and Sp_ClassVN and the known feature spectrum group KSp that is created in advance. The class determination unit 320 generates a determination result RD using at least a part of the class similarities Sclass_ConvVN1, Sclass_ConvVN2, and Sclass_ClassVN. The determination result RD includes a determined class D_class and a similarity value S_value corresponding to the determined class D_class.

In the present disclosure, the vector neuron layer used for calculation of a similarity is also referred to as a "specific layer". As the specific layer, one or more optional number of vector neuron layers can be used. A configuration of the feature spectrum, a method of calculating the similarity using the feature spectrum, and a method of determining the class to be determined will be described later.

Figure 4:
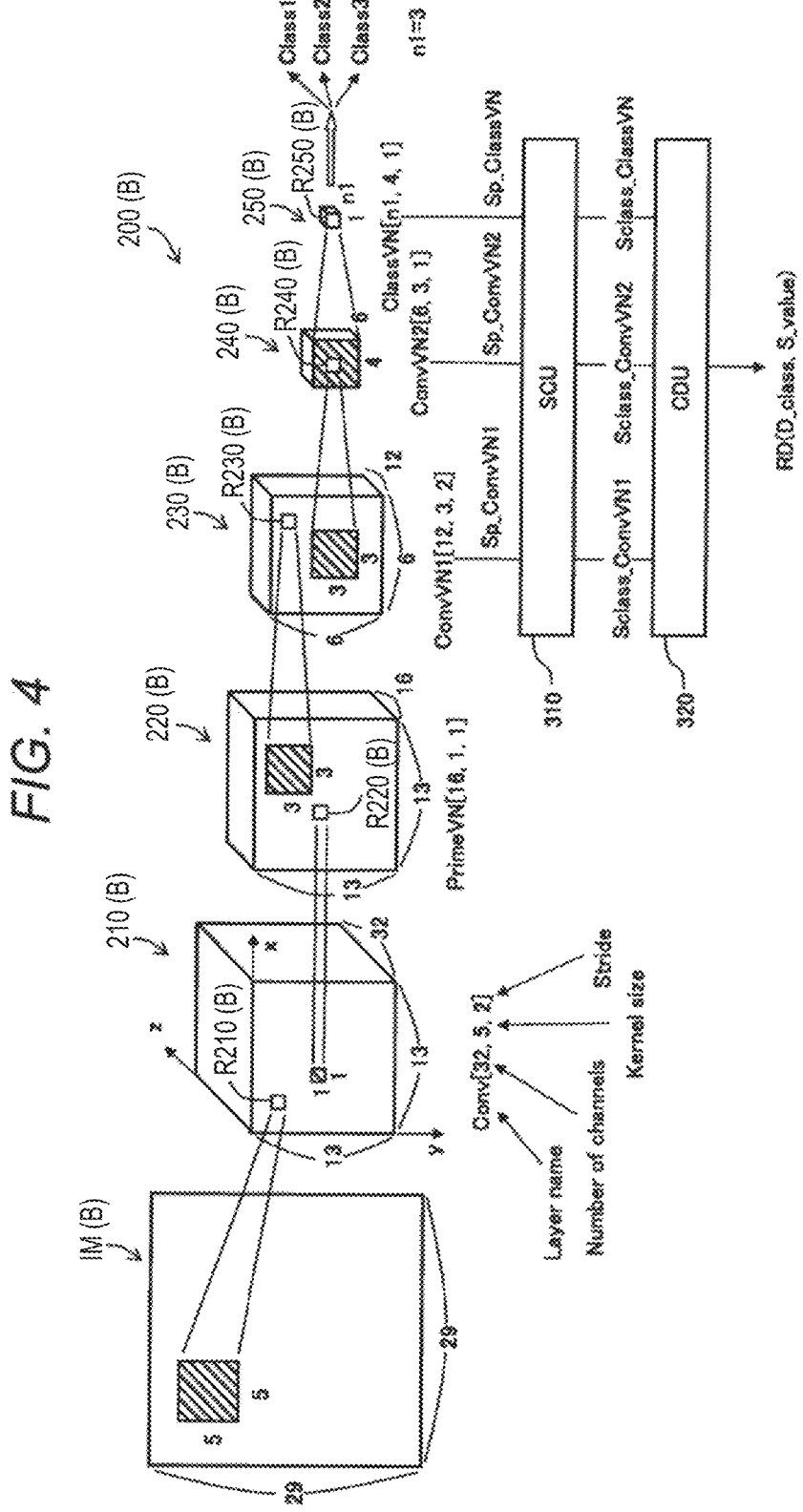
FIG. 4 is a diagram illustrating another configuration of the machine learning model.

FIG. 4 is a diagram illustrating another configuration of the machine learning model 200(B). This machine learning model 200(B) is different from the machine learning model 200(A) in FIG. 3 using the input data of the one-dimensional array in that the input data IM(B) is data of a two-dimensional array. The configurations of the layers 210(B) to 250(B) in FIG. 4 can be described as follows.

Description of Configuration of Each Layer

Conv layer 210(B): Conv [32, 5, 2]
PrimeVN layer 220(B): PrimeVN [16, 1, 1]
ConvVN1 layer 230(B): ConvVN1 [12, 3, 2]
ConvVN2 layer 240(B): ConvVN2 [6, 3, 1]
ClassVN layer 250(B): ClassVN [n1, 4, 1]
Vector dimension VD: VD=16

The machine learning model 200(B) shown in FIG. 4 can be used, for example, in the class determination system that performs the class determination on an image to be determined. However, in the following description, the machine learning model 200(A) shown in FIG. 3 is used. For example, the reference characters used hereinafter without (A) or (B) refer to a part of the machine learning model 200(A) but may be similarly applicable to the machine learning model 200(B).

Figures 5, 6:
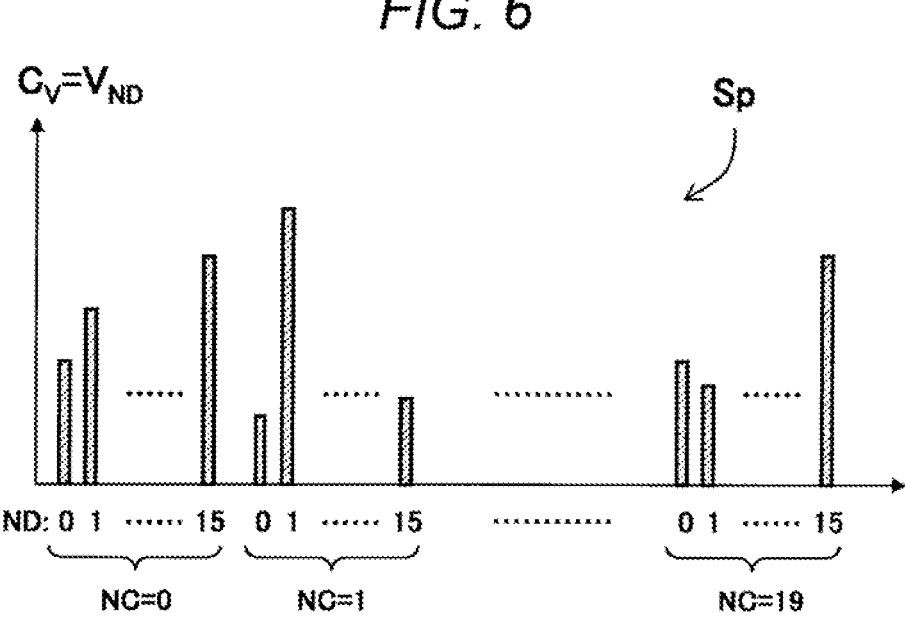
FIG. 5 is a flowchart showing a preparation step of the machine learning model.
FIG. 6 is a diagram illustrating a feature spectrum.

FIG. 5 is a flowchart showing a processing procedure of a preparation step of the machine learning model. This preparation step is, for example, a step executed by a manufacturer of the printer 10.

In step S110 of FIG. 5, the class determination processing unit 114 executes learning of the machine learning model 200 using a plurality of pieces of training data TD. A label is assigned in advance to each piece of training data TD. In the present embodiment, it is assumed that one of labels 1 to 3 is assigned to each piece of training data TD. These labels correspond to the three classes Class 1 to Class 3 of the machine learning model 200. In the present disclosure, the "label" and the "class" mean the same.

When the learning using the plurality of pieces of training data TD is completed, the learned machine learning model 200 is stored in the memory 120. In step S120 of FIG. 5, the plurality of pieces of training data TD are input again to the learned machine learning model 200 to generate the known feature spectrum group KSp. The known feature spectrum group KSp is a set of feature spectra described below.

FIG. 6 is a diagram illustrating a feature spectrum Sp obtained by inputting optional piece of input data to the learned machine learning model 200. Here, the feature spectrum Sp obtained from the output of the ConvVN1 layer 230 will be described. A horizontal axis in FIG. 6 is a position of a vector element related to output vectors of a plurality of nodes included in one partial region R230 of the ConvVN1 layer 230. The position of the vector element is represented by a combination of an element number ND and a channel number NC of the output vector at each node. In the present embodiment, since a vector dimension is 16, the element number ND of the output vector is 16 from 0 to 15. Since the number of channels of the ConvVN1 layer 230 is 20, the channel number NC is 20 from 0 to 19. In other words, the feature spectrum Sp is obtained by arranging a plurality of element values of the output vector of each vector neuron included in the partial region R230 over the plurality of channels along the third axis Z.

A vertical axis in FIG. 6 shows a feature value $C_V$ at each spectral position. In this example, the feature value $C_V$ is a value $V_{ND}$ Of each element of the output vector. As the feature value $C_V$, a value obtained by multiplying the value $V_{ND}$ of each element of the output vector by a normalization coefficient described later may be used, or the normalization coefficient may be used as it is. In the latter case, the number of feature values $C_V$ included in the feature spectrum Sp is equal to the number of channels, which is 20. The normalization coefficient is a value corresponding to a vector length of the output vector at the node.

The number of the feature spectrum Sp obtained from the output of the ConvVN1 layer 230 with respect to one piece of input data is equal to the number of plane positions (x, y) of the ConvVN1 layer 230, that is, the number of the partial regions R230, and is thus 6. Similarly, three feature spectra Sp are obtained from the output of the ConvVN2 layer 240 with respect to one piece of input data, and one feature spectrum Sp is obtained from the output of the ClassVN layer 250. When the training data TD is input again to the learned machine learning model 200, the similarity calculation unit 310 calculates the feature spectrum Sp shown in FIG. 6, and registers the feature spectrum Sp in the memory 120 as the known feature spectrum group KSp.

Figure 7:
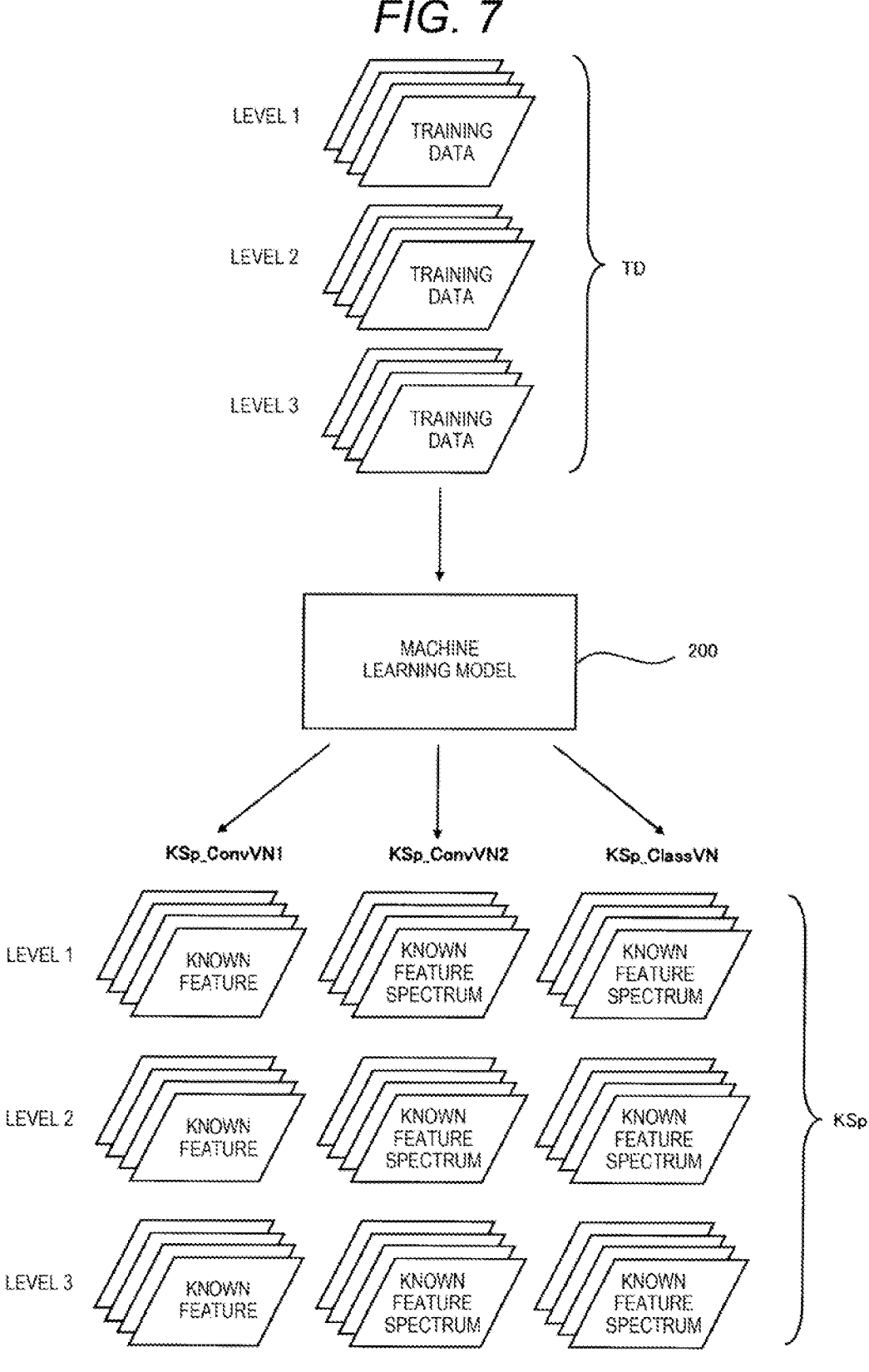
FIG. 7 is a diagram illustrating a state in which a known feature spectrum group is created using training data.

FIG. 7 is a diagram illustrating a state in which the known feature spectrum group KSp is created using the training data TD. In this example, by inputting the training data TD having a label of 1 to 3 to the learned machine learning model 200, the feature spectra KSp_ConvVN1, KSp_ConvVN2, and KSp_ClassVN associated with the respective labels or classes are obtained from the outputs of the three vector neuron layers, that is, the outputs of the ConvVN1 layer 230, the ConvVN2 layer 240, and the ClassVN layer 250. These feature spectra KSp_ConvVN1, KSp_ConvVN2, and KSp_ClassVN are stored as the known feature spectrum group KSp in the memory 120.

FIG. 8 is a diagram illustrating a configuration of the known feature spectrum group KSp. In this example, the known feature spectrum group KSp_ConvVN1 obtained from the output of the ConvVN1 layer 230 is shown. Although the known feature spectrum group KSp_ConvVN2 obtained from the output of the ConvVN2 layer 240 and the known feature spectrum group KSp_ClassVN obtained from the output of the ClassVN layer 250 have the same configuration, an illustration is omitted in FIG. 8. As the known feature spectrum group KSp, what is obtained from the output of at least one vector neuron layer may be registered.

Each record of the known feature spectrum group KSp_ConvVN1 includes a parameter i indicating an order of the label or the class, a parameter j indicating an order of the specific layer, a parameter k indicating an order of the partial region Rn, a parameter q indicating a data number, and a known feature spectrum KSp. The known feature spectrum KSp is the same as the feature spectrum Sp in FIG. 6.

The parameter i, i.e., the class has the same value of 1 to 3 as the label. The parameter j, i.e., the specific layer takes values of 1 to 3 each indicating one of the three specific layers 230, 240, and 250. The parameter k, i.e., the partial region Rn takes a value indicating one of the plurality of partial regions Rn included in each specific layer, that is, a value indicating the plane position (x, y). Since the number of partial regions R230 in the ConvVN1 layer 230 is 6, k=1 to 6. The parameter q, i.e., the data number indicates the number of the training data to which the same label is attached, and takes values of 1 to max1 for the class 1, 1 to max2 for the class 2, and 1 to max3 for the class 3.

The plurality of pieces of training data TD used in step S120 is not necessary to be the same as the plurality of pieces of training data TD used in step S110. However, even in step S120, if some or all of the plurality of pieces of training data TD used in step S110 are used, there is an advantage that it is not necessary to prepare new training data.

FIG. 9 is a flowchart showing a processing procedure of a medium determination and printing step using the learned machine learning model. The medium determination and printing step is executed by a user who uses the printer 10, for example.

In step S210, the user instructs the class determination processing unit 114 to determine whether a target print medium, which is a print medium to be processed, requires the class determination processing. Even when the user knows a type of the target print medium, it may be instructed that the class determination processing is necessary for confirmation. When the class determination processing is not necessary, the processing proceeds to step S260, in which the user selects the print setting suitable for the target print medium, and in step S270, the print processing unit 112 causes the printer 10 to execute printing using the target print medium. On the other hand, when the type of the target print medium is unknown and the class determination processing is necessary, the processing proceeds to step S220.

In step S220, the class determination processing unit 114 causes the spectrometer 30 to execute the spectroscopic measurement on the target print medium, thereby acquiring the spectral data. The spectral data is used as the data to be determined, which is to be input to the machine learning model 200.

In step S230, the class determination processing unit 114 inputs the data to be determined to the learned machine learning model 200, and calculates the feature spectrum Sp. In step S240, the similarity calculation unit 310 calculates the class similarity based on the feature spectrum Sp obtained in accordance with the input of the data to be determined and the registered known feature spectrum group KSp.

Figure 10:
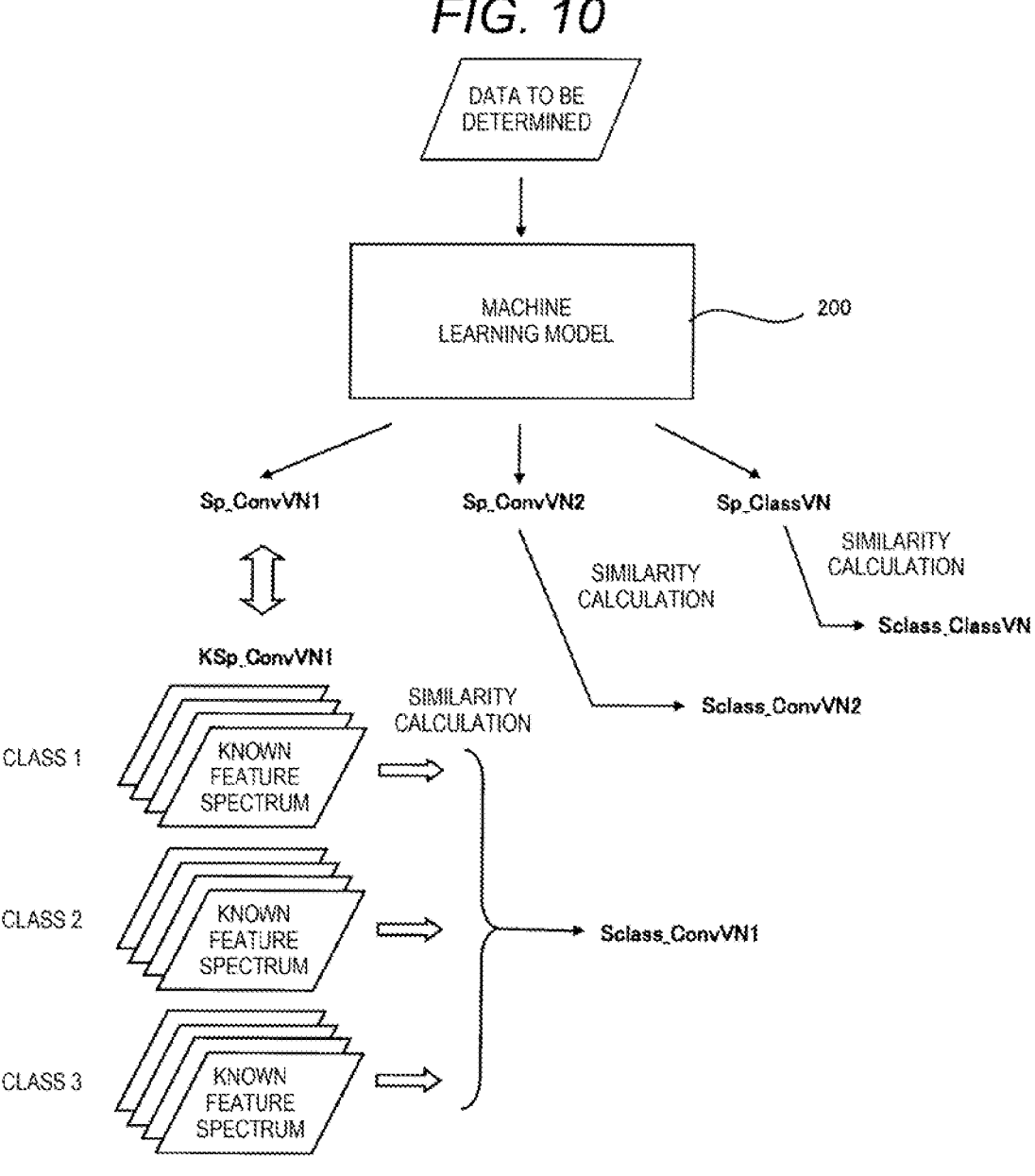
FIG. 10 is a diagram illustrating a state in which a class similarity related to data to be determined is obtained.

FIG. 10 is a diagram illustrating a state in which the class similarity related to the data to be determined is obtained. When the data to be determined is input to the machine learning model 200, the class determination processing unit 114 calculates the feature spectra Sp_ConvVN1, Sp_ConvVN2, and Sp_ClassVN based on the outputs of the ConvVN1 layer 230, the ConvVN2 layer 240, and the ClassVN layer 250, respectively. The similarity calculation unit 310 calculates the class similarity Sclass_ConvVN1 by using the feature spectrum Sp_ConvVN1 obtained from the output of the ConvVN1 layer 230 and the known feature spectrum group KSp_ConvVN1. A specific method of calculating the class similarity will be described later. The class similarities Sclass_ConvVN2 and Sclass_ClassVN of the ConvVN2 layer 240 and the ClassVN layer 250 are calculated in the same manner.

It is not necessary to generate all the class similarities Sclass_ConvVN1, Sclass_ConvVN2, and Sclass_ClassVN by using the three vector neuron layers 230, 240 and 250, respectively, but it is preferable to calculate the class similarity using one or more vector neuron layers among these three. As described above, in the present disclosure, the vector neuron layer used for the calculation of the similarity is referred to as the "specific layer".

In step S250, the class determination unit 320 determines a class of the target print medium, that is, the type of the target print medium, according to the class similarity obtained in step S240. In step S260, according to the type of the target print medium, the print processing unit 112 selects the print setting by referring to the print setting table PST. In step S270, the print processing unit 112 executes the printing according to the print setting. According to the procedure of FIG. 9, even when the type of the target print medium is unknown, the type of the target print medium can be determined using the machine learning model 200, so that it is possible to execute printing using print setting suitable for the type.

B. Method of Calculating Similarity

As a method of calculating the class similarity shown in FIG. 10 described above, for example, any one of the following three methods can be adopted.

1. First calculation method M1 for obtaining class similarity without considering correspondence between partial regions Rn in feature spectrum Sp and known feature spectrum group KSp 2. Second calculation method M2 for obtaining class similarity based on corresponding partial regions Rn in feature spectrum Sp and known feature spectrum group KSp 3. Third calculation method M3 for obtaining class similarity without considering partial region Rn at all Hereinafter, a method of calculating the class similarity Sclass_ConvVN1 based on the output of the ConvVN1 layer 230 according to the three calculation methods M1, M2, and M3 will be sequentially described.

Figure 11:
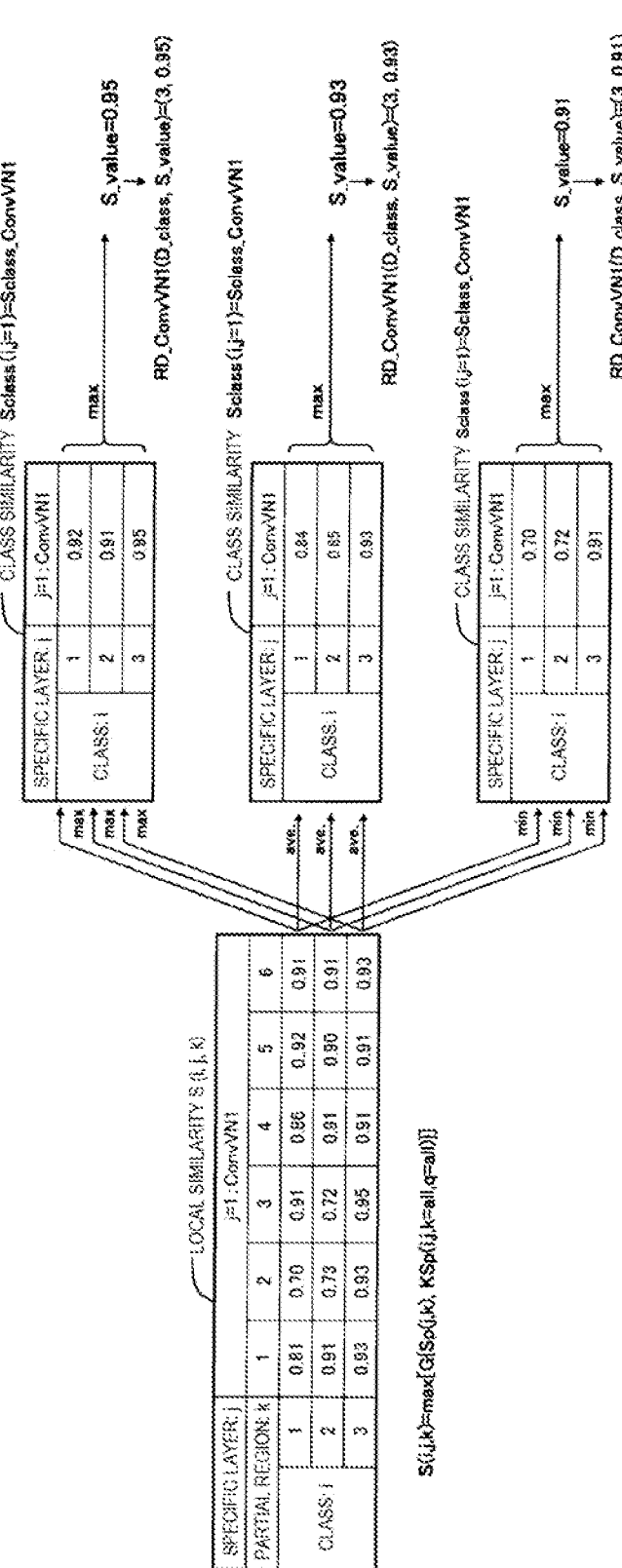
FIG. 11 is a diagram illustrating a first calculation method for the class similarity.

FIG. 11 is a diagram illustrating the first calculation method M1 for the class similarity. In the first calculation method M1, first, a local similarity S (i, j, k) indicating a similarity of each class i is calculated for each partial region k based on the output of the ConvVN1 layer 230, which is the specific layer. Then, based on the local similarity S (i, j, k), one of three types of class similarities Sclass (i, j) shown on a right side in FIG. 11 is calculated. The class similarity Sclass (i, j) is the same as the class similarity Sclass_ConvVN1 shown in FIG. 3 and FIG. 10.

In the first calculation method M1, the local similarity S (i, j, k) is calculated using the following equation.

$$S(i,j,k)=\max[G\{Sp(j,k),KSp(i,j,k=\text{all},q=\text{all})\}] \quad (2), \text{ wherein}$$

i is a parameter indicating the class, j is a parameter indicating the specific layer, k is a parameter indicating the partial region Rn, q is a parameter indicating the data number, $G\{a, b\}$ is a function for obtaining the similarity between a and b, Sp (j, k) is a feature spectrum obtained from an output of a specific partial region k in a specific layer j according to the data to be determined, KSp (i, j, k=all, q=all) is, among the known feature spectrum group KSp shown in FIG. 8, a known feature spectrum of all data numbers q in all partial regions k in the specific layer j associated with the class i, and max[X] is a logical calculation that takes a maximum value of values of X.

Note that "a" in the function $G\{a, b\}$ for obtaining the similarity is 1 or a set, b is a set, and a return value is plural. As the function $G\{a, b\}$, for example, an equation for obtaining a cosine similarity or an equation for obtaining a similarity according to a distance can be used.

The three types of class similarities Sclass (i, j) shown on the right side in FIG. 11 are obtained by taking a maximum value, an average value, and a minimum value of the local similarity S (i, j, k) in the plurality of partial regions k for each class i. The use of calculation of the maximum value, the average value, or the minimum value depends on a use purpose of the class determination processing. For example, when the purpose is to determine an object using a natural image, it is preferable to obtain the class similarity Sclass (i, j) by taking the maximum value of the local similarity S (i, j, k) for each class i. When the purpose is to determine the type of the print medium or the purpose is to determine a quality using an image of an industrial product, it is preferable to obtain the class similarity Sclass (i, j) by taking the minimum value of the local similarity S (i, j, k) for each class i. In addition, it may be preferable to obtain the class similarity Sclass (i, j) by taking the average value of the local similarity S (i, j, k) for each class i. The use of these three types of calculations is set in advance by the user experimentally or empirically.

In an example of FIG. 11, a final determination result RD_ConvVN1 is further determined based on the class similarity Sclass (i, j). The determination result RD_ConvVN1 can be expressed in a format including the determined class D_class and the similarity value S_value corresponding to the determined class D_class. The similarity value S_value is obtained by taking the maximum value of the similarity values for the three classes 1 to 3 in the class similarity Sclass (i, j). The determined class D_class is a class having a maximum similarity value in the class similarity Sclass (i, j).

As described above, in the first calculation method M1 for the class similarity, 1. the local similarity S (i, j, k) which is the similarity between the feature spectrum Sp obtained from the output of the specific partial region k in the specific layer j according to the data to be determined and all the known feature spectra KSp associated with the specific layer j and each class i is obtained, 2. the class similarity Sclass (i, j) is obtained by taking the maximum value, the average value, or the minimum value of the local similarity S (i, j, k) for the plurality of partial regions k for each class i, 3. the maximum value of the class similarity Sclass (i, j) is obtained as the similarity value S_value between the feature spectrum Sp and the known feature spectrum group KSp for each class i, and 4. the class associated with the maximum similarity value S_value over the plurality of classes i is determined as the determined class D_class.

According to the first calculation method M1, the class similarity Sclass (i, j) and the determination result can be obtained by a relatively simple calculation and procedure.

Figure 12:
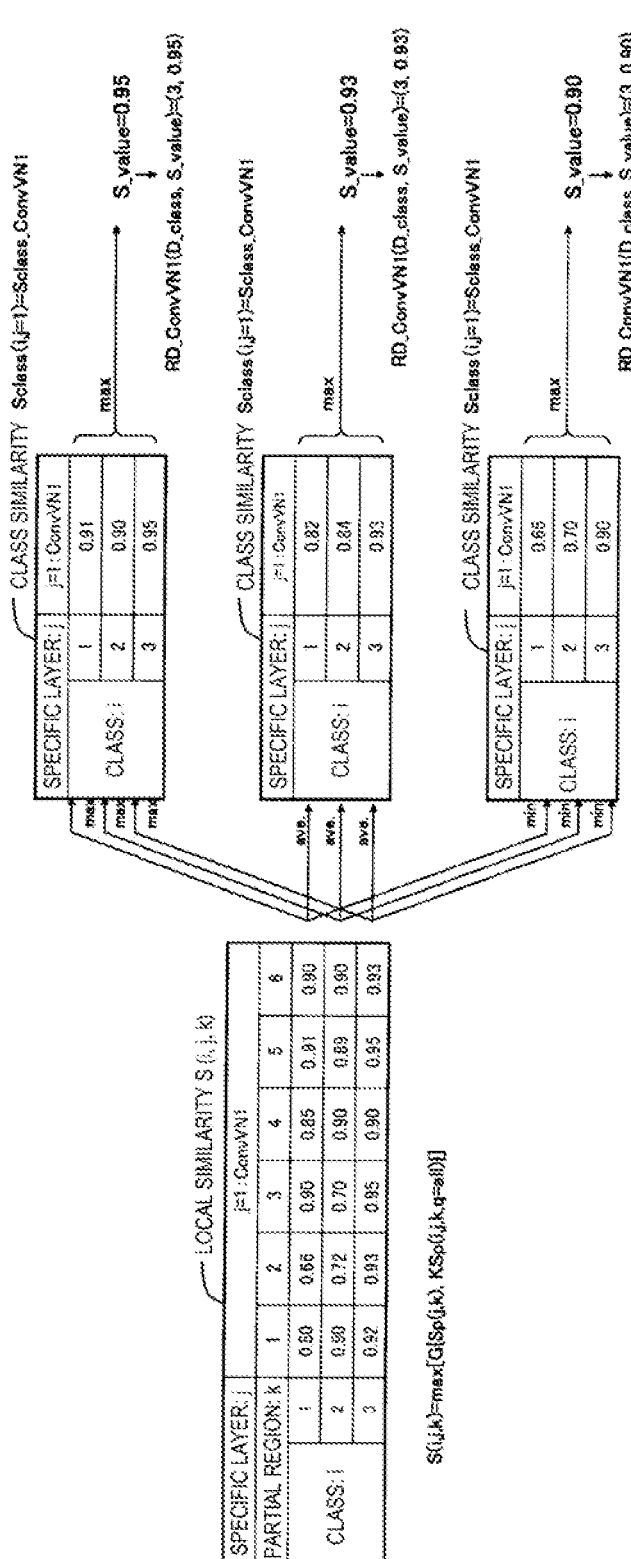
FIG. 12 is a diagram illustrating a second calculation method for the class similarity.

FIG. 12 is a diagram illustrating the second calculation method M2 for the class similarity. In the second calculation method M2, the local similarity S (i, j, k) is calculated using the following equation instead of the above Equation (2).

$$S(i,j,k)=\max[G\{Sp(j,k),KSp(i,j,k,q=\text{all})\}] \qquad (3), \text{wherein}$$

KSp (i, j, k, q=all) is the known feature spectrum of all the data numbers q in the specific partial region k in the specific layer j associated with the class i in the known feature spectrum group KSp shown in FIG. 8.

In the first calculation method M1 described above, the known feature spectrum KSp (i, j, k=all, q=all) in all the partial regions k in the specific layer j is used, whereas in the second calculation method M2, only the known feature spectrum KSp (i, j, k, q=all) for a partial region k same as the partial region k of the feature spectrum Sp (j, k) is used. The other method in the second calculation method M2 is the same as that in the first calculation method M1.

In the second calculation method M2 for the class similarity, 1. the local similarity S (i, j, k) which is the similarity between the feature spectrum Sp obtained from the output of the specific partial region k in the specific layer j according to the data to be determined and all the known feature spectra KSp associated with the specific partial region k in the specific layer j and each class i is obtained,
2. the class similarity Sclass (i, j) is obtained by taking the maximum value, the average value, or the minimum value of the local similarity S (i, j, k) for the plurality of partial regions k for each class i,
3. the maximum value of the class similarity Sclass (i, j) is obtained as the similarity value S_value between the feature spectrum Sp and the known feature spectrum group KSp for each class i, and
4. the class associated with the maximum similarity value S_value over the plurality of classes i is determined as the determined class D_class.

According to the second calculation method M2, the class similarity Sclass (i, j) and the determination result can also be obtained by a relatively simple calculation and procedure.

FIG. 13 is a diagram illustrating the third calculation method M3 for the class similarity. In the third calculation method M3, the class similarity Sclass (i, j) is calculated based on the output of the ConvVN1 layer 230, which is the specific layer, without obtaining the local similarity S (i, j, k).

The class similarity Sclass (i, j) obtained by the third calculation method M3 is calculated using the following equation.

$$Sclass(i,j)=\max[G\{Sp(j,k=\text{all}),KSp(i,j,k=\text{all},q=\text{all})\}] \qquad (4), \text{wherein}$$

Sp (j, k=all) is the feature spectrum obtained from the outputs of all the partial regions k in the specific layer j according to the data to be determined.

The method of obtaining a final determination result from the class similarity Sclass (i, j) is the same as that of the first calculation method M1 or the second calculation method M2 described above.

As described above, in the third calculation method M3 of the class similarity, 1. the class similarity Sclass (i, j), which is the similarity between all the feature spectra Sp obtained from the output of the specific layer j according to the data to be determined, and all the known feature spectra KSp associated with the specific layer j and each class i, is obtained for each class,
2. the maximum value of the plurality of class similarity Sclass (i, j) is obtained as the similarity value S_value between the feature spectrum Sp and the known feature spectrum group KSp for each class i, and
3. the class associated with the maximum similarity value S_value over the plurality of classes i is determined as the determined class D_class.

According to the third calculation method M3, the class similarity Sclass (i, j) and the determination result can be obtained by a simpler calculation and procedure.

Each of the three calculation methods M1 to M3 described above is a method of calculating the class similarity for each specific layer i and determining the class to be determined. As described above, in the present embodiment, one or more of the plurality of vector neuron layers 230, 240, and 250 shown in FIG. 3 can be used as specific layers to calculate the class similarity, and the class of the data to be determined can be determined based on the class similarity. When the plurality of specific layers are used, for example, the following determination method for the class to be determined can be adopted.

FIG. 14 is a diagram illustrating a first determination method MM1 for a class to be determined using a plurality of specific layers. Here, determination results RD_ConvVN1, RD_ConvVN2, and RD_ClassVN are calculated for the three specific layers, that is, the ConvVN1 layer 230, the ConvVN2 layer 240, and the ClassVN layer 250, respectively. As the final determined class D_class, among the determined classes D_class represented by the plurality of determination results RD_ConvVN1, RD_ConvVN2, and RD_ClassVN related to the plurality of specific layers, the most frequently appearing class is adopted. In an example of FIG. 14, since the class 3 appears most frequently, this class is adopted or derived as the final determined class D_class. According to the first determination method MM1, the class determination can be performed with higher accuracy using a plurality of specific layers. When there are a plurality of classes that appear most frequently, all of the plurality of classes may be presented as the determined class to the user.

FIG. 15 is a diagram illustrating a second determination method MM2 for the class to be determined using the plurality of specific layers. In the second determination method MM2, the class to be determined is determined using a specific layer indicating the most statistically significant determination result among the plurality of specific layers. In an example of FIG. 15, the ConvVN1 layer 230 and the ConvVN2 layer 240 are used as the specific layers. First, for each partial region k in the ConvVN1 layer 230, a class in which the local similarity S (i, j, k) is the maximum value is determined, and a processing of allocating a class parameter value i of the class to each partial region k is executed. The class parameter value i is a value indicating an order of the plurality of classes. The class parameter value i is, for example, a continuous integer. In the present embodiment, the class parameter value i and the class i are the same. Similarly, for the ConvVN2 layer 240, the class in which the local similarity S (i, j, k) is the maximum value is determined, and the processing of allocating the class parameter value i of the class to each partial region k is executed.

In addition, in the second determination method MM2, when there is no difference in the local similarity S between the classes with respect to each partial region k, that is, when an error or variance over the plurality of classes related to the local similarity S of a certain partial region k is within a threshold value, the class parameter value may not be allocated to the partial region k. In the case of obtaining the variance of the class parameter values, the variance is obtained by excluding the partial region k to which the class parameter value is not assigned. Accordingly, since the variance can be obtained only in a characteristic portion, the class determination can be performed with higher accuracy.

In the second determination method MM2, further, in each specific layer, the variance of a distribution of the class parameter values i in the plurality of partial regions k is calculated. This variance is a value of a statistical variance for the class parameter value i. In the example of FIG. 15, a variance in the ConvVN1 layer 230 is 0.14, and a variance in the ConvVN2 layer 240 is 0.22. Among these specific layers 230 and 240, since it is expected that a larger deviation in the distribution of the class parameter value i leads to a more clear determination result, a class determination result for a specific layer having a low variance is adopted. In other words, the class of the data to be determined is determined using a class similarity obtained for a specific layer having the smallest variance among the plurality of specific layers. According to the second determination method MM2, the class determination can be performed with higher accuracy using a plurality of specific layers.

As the class determination method, a method other than the above method may be adopted. For example, a result of a layer closest to the output layer among the plurality of specific layers may be preferentially output as the determination result.

As described above, in the present embodiment, the feature spectrum Sp is calculated based on the output of the specific layer of the machine learning model 200 according to the input of the data to be determined, the class similarity Sclass (i, j) between the feature spectrum Sp and the known feature spectrum group KSp related to each of the plurality of classes is calculated, and the class of the data to be determined is determined according to the class similarity Sclass (i, j), so that the accuracy of the class determination can be improved.

C. Calculation Method for Output Vector of Each Layer in Machine Learning Model

The calculation method for the output vector of each layer in the machine learning model 200 shown in FIG. 3 is as follows. The machine learning model 200 shown in FIG. 4 is also the same except for the values of individual parameters.

In each node of the PrimeVN layer 220, a scalar output of 1×1×32 nodes in the Conv layer 210 is regarded as a 32-dimensional vector, and a vector output at the node is obtained by multiplying this vector by a transformation matrix. The transformation matrix is an element of a kernel having a surface size of 1×1, and is updated by the learning of the machine learning model 200. The processing of the Conv layer 210 and the processing of the PrimeVN layer 220 can be integrated to form one primary vector neuron layer.

When the PrimeVN layer 220 is referred to as a "lower layer L" and the ConvVN1 layer 230 adjacent to an upper side thereof is referred to as an "upper layer L+1", the output at each node of the upper layer L+1 is determined using the following equation.

$$v_{ij} = W_{ij}^L M_i^L$$

$$u_j = \sum_i v_{ij}$$

$$a_j = F(\|u_j\|)$$

$$M_j^{L+1} = a_j \times \frac{1}{\|u_j\|} u_j$$

Here, $M_i^L$ is an output vector of the ith node in the lower layer L, $M_j^{L+1}$ is an output vector of the jth node in the upper layer L+1, $V_{ij}$ is a prediction vector of the output vector $M_j^{L+1}$, $W_{ij}^L$ is a prediction matrix for calculating the prediction vector $v_{ij}$ based on the output vector $M_i^L$ at the lower layer L, $u_j$ is a sum of the prediction vectors $v_{ij}$, that is, a sum vector, which is a linear combination, $a_j$ is an activation value, which is a normalization coefficient obtained by normalizing a norm $|u_j|$ of the sum vector $u_j$, and F(X) is a normalization function for normalizing X.

As the normalization function F(X), for example, the following equation (E3a) or (E3b) can be used.

$$a_j = F(\|u_j\|) = softmax(\|u_j\|) = \frac{\exp(\beta\|u_j\|)}{\sum_k \exp(\beta\|u_k\|)}$$

$$a_j = F(\|u_j\|) = \frac{\|u_j\|}{\sum_k \|u_k\|}$$

Here, k is an ordinal number for all the nodes in the upper layer L+1, and

β is an adjustment parameter which is an optional positive coefficient, for example, β=1.

In the above equation (E3a), the activation value $a_j$ is obtained by normalizing the norm $|u_j|$ of the sum vector $u_j$ with a softmax function for all the nodes in the upper layer L+1. On the other hand, in the equation (E3b), the activation value $a_j$ is obtained by dividing the norm $|u_j|$ of the sum vector $u_j$ by the sum of the norms $|u_j|$ for all the nodes in the upper layer L+1. As the normalization function F(X), a function other than the equations (E3a) and (E3b) may be used.

The ordinal number i in the above equation (E2) is conveniently assigned to the node in the lower layer L used to determine the output vector $M_j^{L+1}$ at the jth node in the upper layer L+1, and takes a value from 1 to n. Further, an integer n is the number of nodes in the lower layer L used to determine the output vector $M_j^{L+1}$ in the jth node in the upper layer L+1. Therefore, the integer n is given by the following equation.

$$n = Nk \times Nc \tag{E5}$$

Here, Nk is the surface size of the kernel, and Nc is the number of channels in the PrimeVN layer 220 which is the lower layer. In the example of FIG. 3, since Nk=5 and Nc=26, n=130.

One kernel used to obtain the output vector in ConvVN1 layer 230 has 1×5×26=130 elements with a kernel size of 1×5 as the surface size and the number of channels of 26 in the lower layer as the depth, and each of these elements is the prediction matrix $W^L_{ij}$. In order to generate the output vectors having 20 channels in the ConvVN1 layer 230, 20 sets of these kernels are necessary. Therefore, the number of prediction matrices $W^L_{ij}$ of the kernel used to obtain the output vector in the ConvVN1 layer 230 is 130×20=2600. These prediction matrices $W^L_{ij}$ are updated by the learning of the machine learning model 200.

As can be seen from the above equations (E1) to (E4), the output vector Miti, at each node in the upper layer L+1 is obtained by the following calculation.

a. The prediction vector $v_{ij}$ is obtained by multiplying the output vector $M^L_i$ at each node in the lower layer L by the prediction matrix $W^L_{ij}$;

b. the sum vector $u_j$, which is the sum of the prediction vectors $v_{ij}$ obtained from each node in the lower layer L, that is, the linear combination, is obtained, c. the activation value $a_j$, which is the normalization coefficient obtained by normalizing the norm $|u_j|$ of the sum vector $u_j$, is obtained, and d. the sum vector $u_j$ is divided by the norm $|u_j|$ and further multiplied by the activation value $a_j$.

The activation value $a_j$ is a normalization coefficient obtained by normalizing the norm $|u_j|$ for all the nodes in the upper layer L+1. Therefore, the activation value $a_j$ can be considered as an index showing a relative output intensity at each node among all the nodes in the upper layer L+1. The norm used in the equations (E3), (E3a), (E3b), and (4) is an L2 norm indicating a vector length in a typical example. At this time, the activation value $a_j$ corresponds to the vector length of the output vector $M^{L+1}_j$. Since the activation value $a_j$ is only used in the above equations (E3) and (E4), it is not necessary to be output from the node. However, it is also possible to configure the upper layer L+1 to output the activation value $a_j$ to the outside.

A configuration of a vector neural network is almost the same as a configuration of a capsule network, and the vector neuron of the vector neural network corresponds to a capsule of the capsule network. However, the calculation according to the above equations (E1) to (E4) used in the vector neural network is different from calculation used in the capsule network. The biggest difference between the two networks is that in the capsule network, the prediction vector $v_{ij}$ on the right side of the above equation (E2) is each multiplied by a weight, and the weight is searched by repeating dynamic routing a plurality of times. On the other hand, in the vector neural network of the present embodiment, since the output vector $M^{L+1}_j$ can be obtained by calculating the above equations (E1) to (E4) once in order, there is an advantage that it is not necessary to repeat the dynamic routing, and the calculation is faster. In addition, in the vector neural network of the present embodiment, an amount of memory required for calculation is smaller than that of the capsule network, and according to an experiment of the inventor of the present disclosure, there is an advantage that the amount of memory of about ½ to ⅓ is sufficient.

In terms of using a node at which a vector is input and output, the vector neural network is the same as the capsule network. Therefore, the advantage of using the vector neuron is also common to the capsule network. In addition, in terms that the feature of a larger region is expressed as the position is higher, and the feature of a smaller region is expressed as the position is lower in the plurality of layers 210 to 250, the vector neural network is the same as a normal convolutional neural network. Here, the "feature" refers to characteristic portion included in the input data to a neural network. In terms that the output vector at a certain node includes spatial information representing spatial information of the feature represented by the node, the vector neural network and the capsule network are superior to the normal convolutional neural network. That is, the vector length of the output vector at the certain node represents an existence probability of the feature represented by the node, and a vector direction represents the spatial information such as a direction and a scale of the feature. Therefore, vector directions of the output vectors at two nodes belonging to the same layer represent a positional relationship between the respective features. Alternatively, it can be said that the vector directions of the output vectors at two nodes represent a variation of the features. For example, in a case of a node corresponding to a feature of an "eye", the direction of the output vector may represent variations such as a size of the eye, a way of lifting, and the like. In the normal convolutional neural network, it is said that the spatial information of the feature is lost by a pulling processing. As a result, there is an advantage that the vector neural network or the capsule network is excellent in performance for identifying the input data as compared with the normal convolutional neural network.

Advantages of the vector neural network can also be considered as follows. That is, in the vector neural network, there is an advantage that the output vector at the node expresses the feature of the input data as coordinates in a continuous space. Therefore, the output vector can be evaluated such that the features are similar if the vector directions are close. In addition, there is also an advantage that even if the feature included in the input data is not covered by the training data, the feature can be determined by interpolation. On the other hand, since the normal convolutional neural network is subjected to random compression by the pulling processing, there is a disadvantage that the features of the input data cannot be expressed as the coordinates in the continuous space.

Since the outputs at the nodes in the ConvVN2 layer 240 and the ClassVN layer 250 are also determined in the same manner by using the above equations (E1) to (E4), detailed description thereof will be omitted. A resolution of the ClassVN layer 250, which is the uppermost layer, is 1×1, and the number of channels is n1.

The output of the ClassVN layer 250 is converted into a plurality of determination values Class 0 to Class 2 for the known classes. These determination values are usually values normalized by the softmax function. Specifically, for example, the determination value for each class can be obtained by executing a calculation of calculating the vector length of the output vector based on the output vector at each node in the ClassVN layer 250 and normalizing the vector length of each node by the softmax function. As described above, the activation value $a_j$ obtained by the above equation (E3) is a value corresponding to the vector length of the output vector $M^{L+1}_j$, and is normalized. Therefore, the activation value $a_j$ at each node in the ClassVN layer 250 may be output and used as it is as the determination value for each class.

In the above embodiment, as the machine learning model 200, the vector neural network for obtaining the output vector by the calculation of the above equations (E1) to (E4) is used, but instead, the capsule network disclosed in U.S. Pat. No. 5,210,798 and WO2009/083553 may be used.

OTHER EMBODIMENTS

The present disclosure is not limited to the above-described embodiments, and can be implemented in various aspects without departing from the spirit of the present disclosure. For example, the present disclosure can be implemented by the following aspects. In order to solve some or all of problems of the present disclosure, or to achieve some or all of effects of the present disclosure, technical characteristics in the above embodiments corresponding to technical characteristics in aspects described below can be replaced or combined as appropriate. The technical features can be deleted as appropriate unless described as essential in the present specification.

(1) According to a first aspect of the present disclosure, there is provided a method of determining a class of data to be determined using a vector neural network type machine learning model having a plurality of vector neuron layers. The method includes: step (a), preparing, for each of a plurality of classes, a known feature spectrum group obtained from an output of a specific layer among the plurality of vector neuron layers when a plurality of pieces of training data are input to the machine learning model; and step (b), executing, by using the machine learning model and the known feature spectrum group, a class determination processing on the data to be determined. The step (b) includes step (b), calculating a feature spectrum based on the output of the specific layer according to an input of the data to be determined to the machine learning model, step (b2), calculating a class similarity between the feature spectrum and the known feature spectrum group related to each of the plurality of classes; and step (b3), determining a class of the data to be determined according to the class similarity.

According to this method, since the class determination on the data to be determined is executed using the similarity related to the feature spectrum, the accuracy of the class determination can be improved.

(2) In the above method, the specific layer has a configuration in which vector neurons arranged on a plane defined by two axes of a first axis and a second axis are arranged as a plurality of channels along a third axis in a direction different from the two axes. In the specific layer, a region specified by a plane position defined by a position of the first axis and a position of the second axis and including the plurality of channels along the third axis is referred to as a partial region. At this time, for each partial region of a plurality of partial regions included in the specific layer, the feature spectrum may be obtained as any one of (i) a first type of feature spectrum obtained by arranging a plurality of element values of an output vector of each vector neuron included in the partial region over the plurality of channels along the third axis, (ii) a second type of feature spectrum obtained by multiplying each element value of the first type of feature spectrum by a normalization coefficient corresponding to a vector length of the output vector, and (iii) a third type of feature spectrum obtained by arranging the normalization coefficient over the plurality of channels along the third axis.

According to this method, the similarity can be obtained by using one of the three types of feature spectra obtained from the output vector of the specific layer.

(3) In the above method, the step (b2) may include obtaining a plurality of local similarities indicating a similarity for each class related to the plurality of partial regions in the specific layer by obtaining a local similarity which is a similarity between the feature spectrum obtained from an output of a specific partial region in the specific layer according to the data to be determined and all the known feature spectra associated with the specific layer and each class, and obtaining, for each class, the class similarity by taking a maximum value, an average value, or a minimum value of the plurality of local similarities related to the plurality of partial regions.

According to this method, the class similarity can be obtained by a relatively simple calculation.

(4) In the above method, the step (b2) may include obtaining a plurality of local similarities indicating a similarity for each class related to the plurality of partial regions in the specific layer by obtaining a local similarity which is a similarity between the feature spectrum obtained from an output of a specific partial region in the specific layer according to the data to be determined and all the known feature spectra associated with the specific partial region of the specific layer and each class, and obtaining, for each class, the class similarity by taking a maximum value, an average value, or a minimum value of the plurality of local similarities related to the plurality of partial regions.

According to this method, the class similarity can be obtained by a relatively simple calculation.

(5) In the above method, the step (b2) may include obtaining the class similarity by obtaining, for each class, a similarity between all the feature spectra obtained from an output of the specific layer according to the data to be determined and all the known feature spectra associated with the specific layer and each class.

According to this method, the class similarity can be obtained by a simpler calculation.

(6) In the above method, when there are a plurality of the specific layers, the step (b3) may include obtaining respective class determination results related to the plurality of specific layers by obtaining a class determination result based on the class similarity for each specific layer, and determining, among classes indicated by the plurality of class determination results, a class that appears most frequently as a determined class of the data to be determined.

According to this method, the class determination can be performed with higher accuracy using the plurality of specific layers.

(7) In the above method, when there are a plurality of the specific layers, the step (b3) may include determining, for each partial region in each specific layer, a class based on the local similarity related to the partial region, and assigning, to the partial region, a class parameter value indicating an order of the class among the plurality of classes, calculating, for each of the plurality of specific layers, a statistical variance related to a distribution of the class parameter values in the plurality of partial regions, and determining a class of the data to be determined using the class similarity obtained for a specific layer having the smallest variance among the plurality of specific layers.

According to this method, the class determination can be performed with higher accuracy using the plurality of specific layers.

(8) According to a second aspect of the present disclosure, there is provided an information processing device that executes a class determination processing of determining a class of data to be determined using a vector neural network type machine learning model having a plurality of vector neuron layers. The information processing device includes: a memory that stores the machine learning model; and a processor that executes a calculation using the machine learning model. The processor is configured to execute a processing (a) of reading, from the memory for each of the plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing on the data to be determined. The processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity.

According to the information processing device, since the class determination on the data to be determined is executed using the similarity related to the feature spectrum, the accuracy of the class determination can be improved.

(9) According to a third aspect of the present disclosure, there is provided a non-transitory computer-readable storage medium storing a computer program for causing a processor to execute a class determination processing of determining a class of data to be determined using a vector neural network type machine learning model having a plurality of vector neuron layers. The computer program causes the processor to execute a processing (a) of reading, from a memory for each of a plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing of the data to be determined. The processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity.

According to the non-transitory computer-readable storage medium storing a computer program, since the class determination on the data to be determined is executed using the similarity related to the feature spectrum, the accuracy of the class determination can be improved.

The present disclosure may be implemented in various forms other than those described above. For example, the present disclosure can be implemented in a form of a computer program for implementing a function of a class determination device, a non-transitory storage medium in which the computer program is recorded, or the like.

What is claimed is:

1. A method for determining a class of data to be determined using a vector neural network type machine learning model having a plurality of vector neuron layers, the method comprising:

step (a), preparing, for each of a plurality of classes, a known feature spectrum group obtained from an output of a specific layer among the plurality of vector neuron layers when a plurality of pieces of training data are input to the machine learning model; and step (b), executing, by using the machine learning model and the known feature spectrum group, a class determination processing on the data to be determined, wherein the step (b) includes step (b1), calculating a feature spectrum based on the output of the specific layer according to an input of the data to be determined to the machine learning model, step (b2), calculating a class similarity between the feature spectrum and the known feature spectrum group related to each of the plurality of classes, and step (b3), determining a class of the data to be determined according to the class similarity, wherein:

the data to be determined is measurement data on spectral reflectance of a print medium, which is acquired by a spectrometer, the specific layer includes two or more vector neuron layers, each of the vector neuron layers in the specific layer has a configuration in which vector neurons are arranged on a conceptual plane defined by two axes of a first axis and a second axis and are arranged as a plurality of channels along a third axis in a depth direction intersecting with the two axes, in each vector neuron layer of the specific layer, when a region specified by a plane position defined by a position of the first axis and a position of the second axis and including the plurality of channels along the third axis is referred to as a partial region, for each partial region of a plurality of partial regions included in each vector neuron layer of the specific layer, the feature spectrum is obtained as any one of (i) a first type of feature spectrum obtained by arranging a plurality of element values of an output vector of each vector neuron included in the partial region over the plurality of channels along the third axis, (ii) a second type of feature spectrum obtained by multiplying each element value of the first type of feature spectrum by a normalization coefficient corresponding to a vector length of the output vector, and (iii) a third type of feature spectrum obtained by arranging the normalization coefficient over the plurality of channels along the third axis, and the step (b2) includes obtaining a plurality of local similarities indicating similarities for each class related to the plurality of partial regions in each vector neuron layer of the specific layer by obtaining a local similarity which is a similarity between the feature spectrum obtained from an output of a specific partial region in each vector neuron layer of the specific layer according to the data to be determined and all the known feature spectra associated with each vector neuron layer of the specific layer and each class, and obtaining, for each class, the class similarity by taking a maximum value, an average value, or a minimum value of the plurality of local similarities related to the plurality of partial regions.

2. The method according to claim 1, wherein all the known feature spectra used in the step (b2) is associated with the specific partial region in each vector neuron layer of the specific layer.

3. The method according to claim 1, wherein when there are a plurality of the specific layers, the step (b3) includes obtaining respective class determination results related to the plurality of specific layers by obtaining a class determination result based on the class similarity related to each vector neuron layer of each specific layer, and determining, among classes indicated by the class determination results, a class that appears most frequently as a determined class of the data to be determined.

4. The method according to claim 1, wherein when there are a plurality of the specific layers, the step (b3) includes determining, for each partial region in each vector neuron layer of each specific layer, a class based on the local similarity related to the partial region, and assigning, to the partial region, a class parameter value indicating an order of the class among the plurality of classes, calculating, for each vector neuron layer of each of the plurality of specific layers, a statistical variance related to a distribution of the class parameter values in the plurality of partial regions, and determining a class of the data to be determined using the class similarity obtained for a vector neuron layer of a specific layer having the smallest variance among the plurality of specific layers.

5. The method according to claim 1, wherein the determined class of the data indicates a type of the print medium, and a printing condition of a printer is adjusted based on the determined type of the print medium.

6. The method according to claim 1, wherein the step (b2) includes obtaining, for each class, three types of the class similarity by taking, respectively, a maximum value, an average value, and a minimum value of the plurality of local similarities related to the plurality of partial regions.

7. The method according to claim 1, wherein an output of each of the vector neuron layers in the specific layer is a vector where spatial information of the feature spectrum including a direction and a scale thereof is preserved.

8. An information processing device that executes a class determination processing of determining a class of data to be determined using a vector neural network type machine learning model having a plurality of vector neuron layers, the information processing device comprising:

a memory that stores the machine learning model; and a processor that executes a calculation using the machine learning model, wherein the processor is configured to execute a processing (a) of, reading, from the memory for each of the plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing on the data to be determined, and the processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity, wherein:

the data to be determined is measurement data on spectral reflectance of a print medium, which is acquired by a spectrometer, the specific layer includes two or more vector neuron layers, each of the vector neuron layers in the specific layer has a configuration in which vector neurons are arranged on a conceptual plane defined by two axes of a first axis and a second axis and are arranged as a plurality of channels along a third axis in a depth direction intersecting with the two axes, in each vector neuron layer of the specific layer, when a region specified by a plane position defined by a position of the first axis and a position of the second axis and including the plurality of channels along the third axis is referred to as a partial region, for each partial region of a plurality of partial regions included in each vector neuron layer of the specific layer, the feature spectrum is obtained as any one of (i) a first type of feature spectrum obtained by arranging a plurality of element values of an output vector of each vector neuron included in the partial region over the plurality of channels along the third axis, (ii) a second type of feature spectrum obtained by multiplying each element value of the first type of feature spectrum by a normalization coefficient corresponding to a vector length of the output vector, and (iii) a third type of feature spectrum obtained by arranging the normalization coefficient over the plurality of channels along the third axis, and the processing (b2) includes obtaining a plurality of local similarities indicating similarities for each class related to the plurality of partial regions in each vector neuron layer of the specific layer by obtaining a local similarity which is a similarity between the feature spectrum obtained from an output of a specific partial region in each vector neuron layer of the specific layer according to the data to be determined and all the known feature spectra associated with each vector neuron layer of the specific layer and each class, and obtaining, for each class, the class similarity by taking a maximum value, an average value, or a minimum value of the plurality of local similarities related to the plurality of partial regions.

9. A non-transitory computer-readable storage medium storing a computer program for causing a processor to execute a class determination processing of determining a class of data to be determined using a vector neural network type machine learning model having a plurality of vector neuron layers, wherein the computer program causes the processor to execute a processing (a) of reading, from a memory for each of a plurality of classes, a known feature spectrum group obtained from an output of a specific layer among the plurality of vector neuron layers when a plurality of pieces of training data are input to the machine learning model, and a processing (b) of executing, by using the machine learning model and the known feature spectrum group, a class determination processing on the data to be determined, and the processing (b) includes a processing (b1) of calculating a feature spectrum based on an output of the specific layer according to an input of the data to be determined to the machine learning model, a processing (b2) of calculating a similarity between the feature spectrum and the known feature spectrum group related to each of the plurality of classes, and a processing (b3) of determining a class of the data to be determined according to the similarity, wherein:

the data to be determined is measurement data on spectral reflectance of a print medium, which is acquired by a spectrometer, the specific layer includes two or more vector neuron layers, each of the vector neuron lavers in the specific layer has a configuration in which vector neurons are arranged on a conceptual plane defined by two axes of a first axis and a second axis and are arranged as a plurality of channels along a third axis in a depth direction intersecting with the two axes, in each vector neuron layer of the specific layer, when a region specified by a plane position defined by a position of the first axis and a position of the second axis and including the plurality of channels along the third axis is referred to as a partial region, for each partial region of a plurality of partial regions included in each vector neuron layer of the specific layer, the feature spectrum is obtained as any one of (i) a first type of feature spectrum obtained by arranging a plurality of element values of an output vector of each vector neuron included in the partial region over the plurality of channels along the third axis, (ii) a second type of feature spectrum obtained by multiplying each element value of the first type of feature spectrum by a normalization coefficient corresponding to a vector length of the output vector, and (iii) a third type of feature spectrum obtained by arranging the normalization coefficient over the plurality of channels along the third axis, and the processing (b2) includes obtaining a plurality of local similarities indicating similarities for each class related to the plurality of partial regions in each vector neuron layer of the specific layer by obtaining a local similarity which is a similarity between the feature spectrum obtained from an output of a specific partial region in each vector neuron layer of the specific layer according to the data to be determined and all the known feature spectra associated with each vector neuron layer of the specific layer and each class, and obtaining, for each class, the class similarity by taking a maximum value, an average value, or a minimum value of the plurality of local similarities related to the plurality of partial regions.

* * * * *